US006719828B1

(12) United States Patent
Lovell et al.

(10) Patent No.: US 6,719,828 B1
(45) Date of Patent: Apr. 13, 2004

(54) HIGH CAPACITY REGENERABLE SORBENT FOR REMOVAL OF MERCURY FROM FLUE GAS

(75) Inventors: John S. Lovell, ADA Technologies, Inc., 8100 Shaffer Pkwy., Suite 130, Littleton, CO (US) 80127-4107; Craig S. Turchi, Lakewood, CO (US); Thomas E. Broderick, Arvada, CO (US)

(73) Assignee: John S. Lovell, Arvada, CO (US)

( * ) Notice: Subject to any disclaimer, the term of this patent is extended or adjusted under 35 U.S.C. 154(b) by 0 days.

(21) Appl. No.: 10/134,178

(22) Filed: Apr. 26, 2002

Related U.S. Application Data

(60) Provisional application No. 60/287,939, filed on Apr. 30, 2001.

(51) Int. Cl.[7] .............................................. B01D 53/04
(52) U.S. Cl. ............................. 95/134; 95/900; 96/108; 423/210
(58) Field of Search .......................... 95/134, 900, 902; 96/108; 423/210

(56) References Cited

U.S. PATENT DOCUMENTS

| | | | |
|---|---|---|---|
| 3,194,629 | A | 7/1965 | Dreibelbis et al. |
| 3,873,581 | A | 3/1975 | Fitzpatrick et al. |
| 4,069,140 | A | 1/1978 | Wunderlich |
| 4,094,777 | A | 6/1978 | Sugier et al. |
| 4,101,631 | A | 7/1978 | Ambrosini et al. |
| 4,196,173 | A * | 4/1980 | deJong et al. ............... 423/210 |
| 4,233,274 | A | 11/1980 | Allgulin |
| 4,273,747 | A * | 6/1981 | Rasmussen ................. 423/210 |
| 4,474,896 | A | 10/1984 | Chao |
| 4,500,327 | A * | 2/1985 | Nishino et al. ............... 95/134 |
| 4,721,582 | A | 1/1988 | Nelson |
| 4,764,355 | A * | 8/1988 | Romey et al. ......... 423/244.03 |

(List continued on next page.)

OTHER PUBLICATIONS

Gash et al., in "Efficient Recovery of Elemental Mercury form Hg(II)–Contaminated Aqueous Media Using a Redox–Recyclable Ion Exchange Material," Environ. Sci. Techno., 1998, pp. 1007–1012, 32(7), American Chemical Society.

Dorhout et al., in "The Design, Synthesis, and Characterization of Redox–Recyclable Materials for Efficient Extraction of Heavy Metal Ions from Aqueous Waste Streams," in New Directions in Materials Synthesis, Winter, C.H., Ed., ACS Symposium Series 727, 1999, pp. 53–68, American Chemical Society.

Brown et al. in "Mercury Measurement and Its Control: What We Know, Have Learned, and Need to Further Investigate." in Journal of the Air & Waste Mangement Association, 1999, pp. 1–97, Air & Waste Management Association.

*Primary Examiner*—Robert H. Spitzer
(74) *Attorney, Agent, or Firm*—Robert M. Hunter

(57) ABSTRACT

A high-capacity regenerable sorbent for removal of mercury from flue gas and processes and systems for making and using the sorbent. A phyllosilicate substrate, for example vermiculite or montmorillinite acts as an inexpensive support to a thin layer for a polyvalent metal sulfide, ensuring that more of the metal sulfide is engaged in the sorption process. The sorbent is prepared by ion exchange between the silicate substrate material and a solution containing one or more of a group of polyvalent metals including tin (both Sn(II) and Sn(IV)), iron (both Fe(II) and Fe(III)), titanium, manganese, zirconium and molybdenum, dissolved as salts, to produce an exchanged substrate. Controlled addition of sulfide ions to the exchanged silicate substrate produces the sorbent. The sorbent is used to absorb elemental mercury or oxidized mercury species such as mercuric chloride from flue gas containing acid gases (e.g., $SO_2$, NO and $NO_2$, and HCl) and other gases over a wide range of temperatures.

58 Claims, 4 Drawing Sheets

U.S. PATENT DOCUMENTS

| | | | |
|---|---|---|---|
| 4,771,030 A | * | 9/1988 | Audeh .................... 502/414 |
| 4,786,483 A | * | 11/1988 | Audeh .................... 423/210 |
| 4,786,484 A | * | 11/1988 | Nelson .................. 423/239.1 |
| 4,814,152 A | | 3/1989 | Yan |
| 4,834,953 A | | 5/1989 | Audeh |
| 4,843,102 A | | 6/1989 | Horton |
| 4,877,515 A | | 10/1989 | Audeh |
| 4,902,662 A | | 2/1990 | Toulhoat et al. |
| 4,911,825 A | | 3/1990 | Roussel et al. |
| 4,917,862 A | * | 4/1990 | Kraw et al. .................... 422/4 |
| 4,933,158 A | * | 6/1990 | Aritsuka et al. ............ 423/210 |
| 4,962,276 A | | 10/1990 | Yan |
| 4,985,389 A | | 1/1991 | Audeh |
| 5,064,626 A | * | 11/1991 | Johnson et al. .......... 423/245.1 |
| 5,080,799 A | | 1/1992 | Yan |
| 5,085,844 A | * | 2/1992 | Nowack et al. .......... 423/245.1 |
| 5,120,515 A | | 6/1992 | Audeh et al. |
| 5,141,724 A | | 8/1992 | Audeh et al. |
| 5,173,286 A | | 12/1992 | Audeh et al. |
| 5,209,773 A | * | 5/1993 | Audhe et al. .................. 75/388 |
| 5,245,106 A | | 9/1993 | Cameron et al. |
| 5,248,488 A | | 9/1993 | Yan |
| 5,304,693 A | * | 4/1994 | Boitiaux et al. ............ 585/648 |
| 5,409,522 A | | 4/1995 | Durham et al. |
| 5,695,726 A | | 12/1997 | Lerner |
| 5,846,434 A | | 12/1998 | Seaman et al. |

* cited by examiner

HIGH CAPACITY REGENERABLE SORBENT FOR REMOVAL OF MERCURY FROM FLUE GAS

CROSS-REFERENCE TO RELATED APPLICATIONS

This application claims the benefit of U.S. Provisional Application No. 60/287,939, filed Apr. 30, 2001, the disclosure of which application is incorporated by reference as if fully set forth herein.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. 68-D-00-225 awarded by the U.S. Environmental Protection Agency.

BACKGROUND OF THE INVENTION

This invention relates to a composition for gas treatment and processes and systems for making and using the composition. In particular, the invention relates to a high capacity regenerable sorbent for removal of mercury from flue gas and processes and systems for making and using the sorbent.

In December, 2000, the U.S. Environmental Protection Agency (EPA) announced its intention to regulate mercury and other air toxics emissions from coal- and oil-fired power plants with implementation as early as November, 2007 (Johnson, J., "Power Plants to Limit Mercury," Chemical and Engineering News, 2001, p. 18, 79). The pending regulation has created an impetus in the utility industry to find cost-effective solutions to meet the impending mercury emission standards, Mercury and its compounds are a group of chemicals identified in Title III of the 1990 Clean Air Act (CAA) Amendments as air toxic pollutants. Mercury is of significant environmental concern because of its toxicity, persistence in the environment, and bioaccumulation in the food chain. Mercury is one of the most volatile species of the 189 toxic compounds listed in the Clean Air Act Amendments and is, therefore, released readily into the environment from natural and anthropogenic sources. Because of its physical and chemical properties, mercury can also be transported regionally through various environmental cycles (Mercury Study Report to Congress, "Volume VIII: An Evaluation of Mercury Control Technologies and Costs," U.S. Environmental Protection Agency, EPA452/R-97-010, December, 1997). Atmospheric deposition of mercury is reported to be the primary cause of elevated mercury levels in fish found in water bodies remote from known sources of this heavy metal.

Domestic coal-fired power plants emit a total of about fifty metric tons of mercury into the atmosphere annually—approximately thirty-three percent of all mercury emissions from U.S. sources (Mercury Study Report to Congress, "Volume I: Executive Summary," United States Environmental Protection Agency, EPA-452/R-97-010, December, 1997; Midwest Research Institute, "Locating and Estimating Air Emissions from Sources of Mercury and Mercury Compounds," EPA-45/R-93-023, September, 1993). Specially designed emission-control systems may be required to capture these volatile compounds effectively. A coal-fired utility boiler emits several different mercury compounds, primarily elemental mercury, mercuric chloride ($HgCl_2$), and mercuric oxide (HgO)—each in different proportions, depending on the characteristics of the fuel being burned and on the method of combustion. Quantifying the rate and composition of mercury emitted from stationary sources has been the subject of much recent work (e.g., Devito, M. S. et al., "Flue Gas Hg Measurements from Coal-Fired Boilers Equipped with Wet Scrubbers," $92^{nd}$ Annual Meeting Air & Waste Management Association, St. Louis, Mo., Jun. 21–24, 1999; Laudal, D. L. et al., "Bench and Pilot Scale Evaluation of Mercury Measurement Methods," DOE/EPRI/EPA Joint Workshop on Mercury Measurement and Speciation Methods, Research Triangle Park, NC, Jan. 29–30, 1997; Hargrove, O. W. et al., "Enhanced Control of Mercury by Wet FGD," proceedings of First Joint Power and Fuel Systems Contractors Conference, Pittsburgh, Pa., Jul. 9–11, 1996; Agbede, R. O., A. J. Bochan, J. L. Clements; R. P. Khosah, T. J. McManus, "A Comparative Evaluation of EPA Method 29, the Ontario Hydro Method, and New Impinger Solution Methods for the Capture and Analysis of Mercury Species," proceedings of the First Joint Power and Fuel Systems Contractors Conference, Pittsburgh, Pa., Jul. 9–11, 1996). Mercury is found predominantly in the vapor-phase in coal-fired boiler flue gas (Mercury Study Report to Congress, "Volume VIII: An Evaluation of Mercury Control Technologies and Costs," United States Environmental Protection Agency, EPA-452/R-97-010, December, 1997). Mercury can also be bound to fly ash in the flue gas. Currently, there is no available control method that efficiently collects all mercury species present in the flue gas stream. Coal-fired combustion flue gas streams are of particular concern because of their composition that includes trace amounts of acid gases, lip including $SO_2$, NO and $NO_2$, and HCl. These acid gases have been shown to degrade the performance of activated carbon, the most widely available sorbent for mercury control, and other proposed sorbents, and so present a challenge that is addressed by the invention described herein.

Today, only municipal solid waste (MSW) incinerators and medical waste combustors are regulated with respect to mercury emissions, and, until the present, the best available control technology for these incinerators is the injection of activated carbon. Although fairly effective for MSW incinerators, activated carbon is a less appealing solution for coal-fired flue gas streams because of the dramatic difference in mercury concentrations. Regulations for mercury control from municipal and medical waste incinerators specify eighty percent control, or outlet emission levels of fifty micrograms per cubic meter ($\mu g/m^3$). In coal-fired flue gas streams, typical uncontrolled mercury concentrations are on the order of ten $\mu g/m^3$. For such low concentrations, projected injection rates for activated carbon to maintain ninety percent control of mercury emissions from coal-fired flue gas streams are high—up to 10,000 pounds or more of activated carbon to remove one pound of mercury, depending on the concentration and speciation of mercury in the flue-gas. The mercury-contaminated carbon becomes part of the ash collected by particulate-control devices and can convert the fly ash from an asset to a liability. This impact on the salability of collected fly ash can double the estimated cost of mercury control for a coal-fired power plant.

At present, the injection of activated carbon is broadly considered the best available control technology for reduction of mercury emissions from coal-fired power plants that do not have wet scrubbers (about seventy-five percent of all plants). Tests of carbon injection, both activated and chemically impregnated, have been reported by several research teams: Miller, S. J., et al., "Laboratory-Scale Investigation of Sorbents for Mercury Control," paper number 94-RA 114A.01, presented at the 87th Annual Air and Waste Management Meeting, Cincinnati, Ohio, Jun. 19–24, 1994; Sjostrom, S., J. et al., "Demonstration of Dry Carbon-Based Sorbent Injection for Mercury Control in Utility ESPs and Baghouses," paper 97-WA72A.07, 90th Annual Meeting of the Air and Waste Management Association, Toronto, Ontario, Canada, Jun. 8–13, 1997; Bustard, C. J. et al., "Sorbent Injection for Flue-gas Mercury Control," presented at the 87th Annual Air and Waste Management Meeting, Cincinnati, Ohio, Jun. 19–24, 1994; and Butz, J. R. et al., "Use of sorbents for Air Toxics Control in a Pilot-Scale COHPAC Baghouse," 92nd Annual Meeting Air & Waste Management Association, St. Louis, Mo., Jun. 21–24, 1999. Activated carbon injection ratios for effective mercury control are widely variable and are explained by the dependence of the sorption process on flue gas temperature and compostion, mercury speciation and also on fly ash chemistry.

The effectiveness of carbon injection for mercury control is limited by sorbent capacity and flue-gas interactions with the activated carbon. Flue gases contain several acid gases including sulfur dioxide ($SO_2$) in the range of a few hundred to a few thousand parts per million (ppm); hydrogen chloride (hydrochloric acid, HCl) up to 100 ppm; and nitrogen oxides (e.g., $NO_2$) in the range of 200 to 2,000 ppm. Studies reported by Miller, S. J et al., in "Mercury Sorbent Development for Coal-Fired Boilers," presented at Conference on Air Quality: Mercury, Trace Elements, and Particulate Matter, McLean, Va., December 1998, at the University of North Dakota's Energy & Environmental Research Center (EERC) examined the effects of various acid gas constituents on the sorption capacity of carbon in a full-factorial test matrix. The EERC workers fed elemental mercury through carbon samples and systematically changed the gas composition. They noted a limited impact by $SO_2$, but a dramatic drop in capacity when HCl or $NO_2$ were present with $SO_2$. Similar results were obtained in studies in a mercury test fixture by one of the applicants (Turchi, C., "Novel Process for Removal and Recovery of Vapor-Phase Mercury," Final Report for Phase II, DOE Contract DE-AC22-95PC95257, Sep. 29, 2000). Thus, the instability of background art sorbents in an acidic flue gas environment adversely affects the utility of activated carbon sorbents and other sorbents having this limitation.

The cost to implement activated carbon mercury control systems has been estimated by the Department of Energy (DOE), EPA, and several researchers. Chang, R. et al., in "Mercury Emission Control Technologies," *Power Engineering*, November, 1995, pp. 51–56, state that with operating and amortized capital costs, carbon injection will cost between $14,000 and $38,000 per pound of mercury removed, which equates to over $4 million per year for a 250-megawatt (MW) power plant.

EPA estimated similar costs for a 975-MW power plant (Mercury Study Report to Congress, "Volume VIII: An Evaluation of Mercury Control Technologies and Costs," U.S. Environmental Protection Agency, EPA452/R-97-010, December, 1997). In their model, four mercury control scenarios were considered to achieve ninety percent reduction in mercury emissions for a plant with an existing ESP. The scenarios were: (1) activated carbon injection; (2) spray cooling and activated carbon injection; (3) spray cooling, activated carbon injection with added fabric filter collection device; and (4) added activated carbon filter bed. The most economical control option employed spray cooling with carbon injection, resulting in a specific cost of $14,000 per pound mercury removed.

The development of more efficient sorbents that can function in the presence of acids would greatly reduce the cost of this mercury control approach by decreasing the amount of sorbent injected, downsizing sorbent injection equipment, and reducing costs for handling and disposing of spent sorbent.

The potential limitations of carbon-based sorbents cited above have led to research into other possible mercury sorbents. Research has demonstrated that noble-metal-impregnated alumina will remove elemental mercury and mercuric chloride from air streams. The sorbent can be thermally regenerated and the desorbed mercury captured in a condenser or oxidizing wet scrubber. Initial cost estimates looked attractive compared with the cost of disposable carbon sorbents (Turchi et al., "Removal of Mercury from Coal Combustion Flue-Gas Using Regenerable Sorbents," 92nd Annual Meeting Air & Waste Management Association, St. Louis, Mo., Jun. 21–24, 1999). In 1998 and 1999, work at coal-combustion facilities in Pennsylvania and New Jersey demonstrated that the sorbent can function in flue-gas but at lower efficiency than was seen in the earlier laboratory tests. Subsequent lab work has suggested that acid-gas attack on the sorbent will reduce its effectiveness, as is the case for all background art sorbents. There is also some indication of flue-gas interactions similar to those witnessed by the EERC group. Research is continuing to determine whether the detrimental effects are temporary or permanent.

Fixed beds of zeolites and carbons have been proposed for a variety of mercury-control applications, but none has been developed specifically for control of mercury in coal flue-gas. Products in this class include Lurgi GmbH's (Frankfurt, Germany) Medisorbon and Calgon Carbon Corporation's (Pittsburgh, Pa.) HGR. Medisorbon is a sulfur-impregnated zeolite and costs ~$17/lb. As with most sulfur-impregnated materials, Medisorbon loses sulfur when heated above 200° F., due to the vapor pressure of sulfur.

The background art is characterized by U.S. Pat. Nos. 3,194,629; 3,873,581; 4,069,140; 4,094,777; 4,101,631; 4,233,274; 4,474,896; 4,721,582; 4,814,152; 4,843,102; 4,843,102; 4,877,515; 4,902,662; 4,911,825; 4,962,276; 4,985,389; 5,080,799; 5,120,515; 5,141,724; 5,173,286; 5,245,106, 5,248,488; 5,409,522; 5,695,726; and 5,846,434; the disclosures of which patents are incorporated by reference as if fully set forth herein.

Dreibelbis et al. in U.S. Pat. No. 3,194,629 discloses a method for removing mercury from gases. The invention is limited in that it relies on impregnation of activated carbon with elemental sulfur. At col. 1, lines 65–67, the reference teaches that "sulfur on alumina was a much poorer adsorbent for mercury vapor than sulfur on activated carbon."

Fitzpatrick et al. in U.S. Pat. No. 3,873,581 discloses a process for reducing the level of contaminating mercury in aqueous solutions. The invention is limited in that the process is applied to aqueous solutions and not to gases and it relies on treating an adsorbent with a mercury-reactive factor. Disclosed absorbents are titania, alumina, silica, ferric oxide, stannic oxide, magnesium oxide, kaolin, carbon, calcium sulfate, activated charcoal, activated carbon, activated alumina, activated clay or diatomaceous earth. The adsorbents, the mercury reactant factors and the methods of making and using the sorbents differ from those disclosed herein.

Wunderlich in U.S. Pat. No. 4,069,140 discloses a method for removing arsenic or selenium from a synthetic hydrocarbonaeous fluid by use of a contaminant-removing material. The contaminant-removing material comprises a carrier material and an active material. Carrier materials are selected from the group consisting of silica, alumina, magnesia, zirconia, thoria, zinc oxide, chromium oxide, clay, kieselguhr, filler's earth, pumice, bauxite and combinations thereof. The active material is selected from the group consisting of iron, cobalt, nickel, at least one oxide of those metals, at least one sulfide of those metals, and combinations thereof. The invention is limited in that teaches sorbent components, methods of sorbent preparation (e.g., involving a calcination step) and methods of sorbent use (e.g., contacting the fluid with the contaminant-removing material in a reducing atmosphere) that differ from those disclosed herein.

Sugier et al. in U.S. Pat. No. 4,094,777 disclose a process for removing mercury from a gas or liquid. This invention is limited in that it requires impregnation of a support only with copper and silver, although other metals can be present, for example iron. Moreover, the supports taught by the reference are limited to silica, alumina, silica-alumina, silicates, aluminates and silico-aluminates. The reference also teaches that incorporation of both metal(s) and pore-forming materials during production of the supports is necessary. Only relatively large absorption masses are envisioned, e.g., alumina balls. Because only large absorption masses are taught, only a fixed bed reactor is taught for contacting the gas with the absorption masses, as would be appropriate for natural gas or electrolytic hydrogen decontamination, which are the only disclosed uses of the compositions and process.

Ambrosini et al. in U.S. Pat. No. 4,101,631 discloses a process for selective absorption of mercury from a gas stream. This invention is limited in that it involves loading a natural or synthetic, three-dimensional, crystalline zeolitic aluminosilicate (zeolite molecular sieve) with elemental sulfur before the zeolite molecular sieve is contacted with the gas stream. Metal sulfides are not present in the zeolite molecular sieve when it is contacted with the gas stream. The use of pellets in absorption beds is disclosed.

Allgulin in U.S. Pat. No. 4,233,274 discloses a method for extracting and recovering mercury from a gas. The invention is limited in that it requires that the gas be contacted with a solution containing mercury(II) ions and ions with the ability to form soluble complexes with such ions.

Chao in U.S. Pat. No. 4,474,896 discloses adsorbent compositions for the adsorption of mercury from gaseous and liquid streams. The invention is limited in that the absorbent compositions are required to contain polysulfide species, while sulfide species may optionally also be present. In the Chao reference, disclosed support materials are limited to carbons, activated carbons, ion-exchange resins, diatomaceous earths, metal oxides, silicates, aluminas, and aluminosilicates, with the most preferred support materials being ion-exchange resins and crystalline aluminosilicate zeolites that undergo a high level of ion-exchange. The open boxworks structures of the preferred zeolite aluminosilicates of the Chao invention differ significantly from the layered structures of the phyllosilicates incorporated into the sorbents disclosed herein. For example, the Chao reference teaches that aluminosilicates of his invention are unstable in the presence of acids (at col. 5, lines 57–68), which is not the case for the phyllosilicates of the invention disclosed herein. In the Chao reference, disclosed metal cations appropriate for ion-exchange or impregnation into the support material are limited to the metal cations of antimony, arsenic, bismuth, cadmium, cobalt, copper, gold, indium, iron, iridium, lead, manganese, molybdenum, mercury, nickel, platinum, silver, tin, tungsten, titanium, vanadium, zinc, zirconium and mixtures thereof. Due to the instability of zeolite support materials in acidic solutions, the Chao reference teaches the exclusion of acidic salt solutions as sources of the metal ions and specifies carboxylic acids, nitrates and sulfates (at col. 5, line 68 and col. 6, lines 1–3). Because polysulfides are a required element of the Chao compositions, disclosed composition production methods include use of a sulfane, heating sulfur and a sulfide-containing support material. The only forms of adsorbent compositions disclosed are ⅟₁₆-inch pellets. It is also important to note that the Chao application was to hydrocarbon gas streams, a non-acidic, reducing environment which is not analogous to a flue gas environment.

Nelson in U.S. Pat. No. 4,721,582 discloses a toxic gas absorbent and processes for making the same. The invention is limited to a composition comprising water-laden, exfoliated vermiculite that is coated with pulverulent magnesium oxide.

Yan in U.S. Pat. No. 4,814,152 discloses a composition and process for removing mercury vapor. The composition comprises a solid support that is limited to a carbonaceous support such as activated carbon and activated coke and refractory oxides such as silicas, aluminas, aluminosilicates, e.g., zeolites. The solid support is impregnated with elemental sulfur.

Audeh in U.S. Pat. No. 4,834,953 discloses a process for removing residual mercury from treated natural gas. The process is limited to contacting the gas first with an aqueous polysulfide solution and then with a soluble cobalt salt on a non-reactive carrier material such as alumina, calcium sulfate or a silica.

Horton in U.S. Pat. No. 4,843,102 discloses a process for removal of mercury from gases with an anion exchange resin. The invention is limited in that the anion exchange resin is saturated with a polysulfide solution.

Audeh in U.S. Pat. No. 4,877,515 discloses the use of polysulfide treated molecular sieves (zeolites) to remove mercury from liquefied hydrocarbons. The invention is limited in that the molecular sieve must be pretreated with an alkali polysulfide.

Toulhoat et al. in U.S. Pat. No. 4,902,662 disclose processes for preparing and regenerating a copper-containing, mercury-collecting mass. The mass is made by combining a solid inorganic carrier, a polysulfide and a copper compound. Appropriate solid inorganic carriers are limited to coal, active carbon, coke, silica, silica carbide, silica gel, natural or synthetic silicates, clays, diatomaceous earths, fuller's earths, kaolin, bauxite, a refractory inorganic oxide such as alumina, titanium oxide, zirconia, magnesia, silica-aluminas, silica-magnesias and silica-zirconias, alumina-boron oxide mixtures, aluminates, silico-aluminates, alumino-silicate crystalline zeolites, synthetic or natural, for example mordenites, faujasites, offretites, erionites, ferrierites, ZSM5 and ZSM11 zeolites, mazzites, and cements.

Roussel et al. in U.S. Pat. No. 4,911,825 disclose a process for elimination of mercury and possibly arsenic in hydrocarbons. The invention requires that a mixture of the hydrocarbon and hydrogen be contacted with a catalyst containing at least one metal from the group consisting of iron, cobalt, nickel and palladium followed by (or mixed with) a capture mass including sulfur or a metal sulfide. The catalyst is preferably deposited on a support chosen from a group limited to alumina, silica-aluminas, silica, zeolites, active carbon, clays and alumina cements.

Yan in U.S. Pat. No. 4,962,276 discloses a process for removing mercury from water or hydrocarbon condensate using a stripping gas. The invention is limited to the use of a polysulfide scrubbing solution for removing the mercury from the stripping gas.

Audeh in U.S. Pat. No. 4,985,389 discloses polysulfide-treated molecular sieves and the use thereof to remove mercury from liquefied hydrocarbons. The molecular sieves are limited to calcined zeolites.

Yan in U.S. Pat. No. 5,080,799 discloses a method for mercury removal from wastewater by regenerative adsorption. The method requires contacting an aqueous stream with an adsorbent composition which includes a metal compound capable of forming an amalgam and/or a sulfide with mercury impregnated into a calcined support. Appropriate metals are limited to bismuth, copper, iron, gold, silver, tin, zinc and palladium and their mixtures. Appropriate supports are limited to those having high surface areas such as $Al_2O_3$, $SiO_2$, $SiO_2/Al_2O_3$, zeolites, clays and active carbon.

Audeh et al. in U.S. Pat. No. 5,120,515 disclose a method for dehydration and removal of residual impurities from gaseous hydrocarbons. The method is limited to replacing an inert protective layer of a pellet with an active compound comprising at least one of copper hydroxide, copper oxide and copper sulfide. Materials for the pellet are limited to alumina, silica-aluminas, molecular sieves, silica gels and combinations thereof.

Audeh et al. in U.S. Pat. No. 5,141,724 disclose a process for removal of mercury from gaseous hydrocarbons. The invention is limited to the use of an in-line mixer which has gas-contacting surfaces of an amalgam-forming metal and a desiccant bed containing pellets of alumina, silica-aluminas, molecular sieves, silica gels, known porous substrates and combinations thereof.

Audeh et al. in U.S. Pat. No. 5,173,286 disclose a process for fixation of elemental mercury present in a spent molecular sieve. The invention is limited to treating the molecular sieve with an aqueous solution containing an alkaline metal salt.

Cameron et al. in U.S. Pat. No. 5,245,106 disclose a method for eliminating mercury or arsenic from a fluid. The process is limited to the incorporation of a copper compound into a solid mineral support, possible calcination of the impregnated support, contact of the impregnated support with elemental sulfur and heat treatment. The solid mineral supports are limited to the group formed by carbon, activated carbon, coke, silica, silicon carbide, silica gel, synthetic or natural silicates, clays, diatomaceous earths, fuller's earths, kaolin, bauxite, inorganic refractory oxides such as for example alumina, titanium oxide, zirconium, magnesium, alimina-silicas, silica-magnesia and silica-zirconia, mixtures of alumina and boron oxide, the aluminates, silico-aluminates, the crystalline, synthetic or natural zeolitic alumino-silicates, for example the mordenites, faujasites, offretites, erionites, ferrierites, zeolites, ZSM5 and ZSM11, the mazzites and the cements.

Yan in U.S. Pat. No. 5,248,488 discloses a method for removing mercury from natural gas. The method is limited to contacting the natural gas with a sorbent material such as silica, alumina, silica-alumina or activated carbon having deposited on the surfaces thereof an active form of elemental sulfur or sulfur-containing material.

Durham et al. in U.S. Pat. No. 5,409,522 disclose a mercury removal apparatus and method. The invention is limited to the use of a noble metal sorbent.

Lerner in U.S. Pat. No. 5,695,726 discloses a process for removal of mercury and cadmium and their compounds from incinerator flue gas. The invention is limited to contacting a gas containing HCl with a dry alkaline material and a sorbent followed by solids separation. The following sorbents that have an affinity for mercuric chloride are disclosed: activated carbon, fuller's earth, bentonite and montmorillonite clays.

Seaman et al. in U.S. Pat. No. 5,846,434 disclose an in-situ groundwater remediation process. The process is limited to mobilizing metal oxide colloids with a surfactant and capturing the colloids on a phyllosilicate clay.

The background art is also characterized by non-patent publications. The teachings of these publications are summarized below.

Gash et al., in "Efficient Recovery of Elemental Mercury from Hg(II)-Contaminated Aqueous Media Using a Redox-Recyclable Ion Exchange Material," Environ. Sci. Techno., 1998, pp. 1007–1012, 32(7), American Chemical Society, discloses the use of lithium-intercalated transition metal dichalcogenides as redox-recyclable ion-exchange materials for the extraction of heavy metal ions from water. The reference also discloses a semisynthetic ion-exchange material named thiomont, which is a thioalkylated montmorillonite clay. This reference is limited in that is does not disclose compositions of the type disclosed herein and the compositions that it does disclose can only be used in water treatment.

Dorhout et al., in "The Design, Synthesis, and Characterization of Redox-Recyclable Materials for Efficient Extraction of Heavy Metal Ions from Aqueous Waste Streams," in New Directions in Materials Synthesis, Winter, C. H., Ed., ACS Symposium Series 727, 1999, pp. 53–68, American Chemical Society, discloses the synthesis and use of lithium-intercalated transition metal disulfides as redox-recyclable materials for the extraction of heavy metals from aqueous waste streams. This reference is limited in that is does not disclose compositions of the type disclosed herein and the compositions that it does disclose can only be used in water treatment.

Brown et al. in "Mercury Measurement and Its Control: What We Know, Have Learned, and Need to Further Investigate." in Journal of the Air & Waste Management Association, 1999, pp. 1–97, Air & Waste Management Association, discloses a variety of mercury control technologies in the Air & Waste Management Association's 29th Annual Critical Review of the state of the art of mercury measurement and control in flue gases produced by the electric utility steam generating industry. It is significant that the description of the state of the art of sorbent injection technologies for mercury capture on pp. 46–80 (which includes a table of proposed fixed-bed sorbents on p. 64) teaches away from the invention disclosed herein and toward activated carbon-based and zeolite-based sorbents.

No individual background art reference or combination of references teach the compositions, processes and systems disclosed herein. In fact, background art references teach away from the elegant solutions proposed herein.

BRIEF SUMMARY OF THE INVENTION

The purpose of the invention is to provide compositions, processes and systems for removal of heavy metals from gas streams, especially those resulting from the combustion of coal which contain the precursors of acid gases such as $SO_2$, NO, $NO_2$, and HCl. One advantage of the invention is that the compositions (sorbents) disclosed herein have a capacity for mercury that greatly exceeds that of the baseline technology, activated carbon. Another advantage is that the disclosed sorbents are unaffected by typical acidic flue gases, which can render background art activated-carbon-based and zeolite-based sorbents virtually useless for this task. Applicants believe that this property is due to the layered structure of the metal sulfide amendments (chalcogenides) used in preferred embodiments of the invention. This layered structure has dimensions such that the polar acid gas molecules are excluded from interlayer sites on the amendment, eliminating the potential for degradation of sorbent performance due to the acid gases. A further advantage is that the strategy of deploying the sorbents into the flue gases as amendments on an inert support maximizes the efficiency and minimizes the costs of the sorbents by exposing only molecularly thin films to the mercury. As a result, all of the sorbent is presented to the flue gas, on a very inexpensive substrate. In addition to having sorption characteristics that are far superior to activated carbon for both elemental and oxidized mercury, the sorbents disclosed herein are less expensive than activated carbon and do not, unlike activated carbon, adversely impact the value of the fly ash, for example, by adversely affecting its use as a concrete additive. Preferred forms of the sorbents disclosed herein ensures that they are "drop-in" replacements for carbon technology and do not require any additional technologies for injection, or collection. The improved capacity and efficiency and the lower costs for the disclosed technology promise to substantially reduce the costs of implementing the EPA's new emissions controls, benefiting both the utility industry and the U.S. public.

In most flue gas treatment systems, the contact time of a mercury sorbent with a mercury-containing gas is of very brief duration and, therefore, only the surface layers of the sorbent actually perform the sorption. In the invention disclosed herein, the silicate substrate acts an inexpensive support to a thin layer of the polyvalent metal sulfide, ensuring that all of the more expensive metal sulfide engages in the sorption process. While estimated manufactured costs for preferred embodiment of the invention were found to be comparable to the cost of activated carbon, because the mercury sorption capacity of the sorbents disclosed herein is three times the capacity for activated carbon (and much more in the presence of acidic flue gases), the annual operating cost of the disclosed sorbent injection system is expected be no more than one-third the estimated annual operating cost for an activated carbon injection system.

The disclosed compositions are able to adsorb mercury at mass ratios of greater than 1:1 under laboratory conditions. In addition, although the sorbent forms a strong chemical bond with mercury at temperatures typically found with flue gas, the compounds can be thermally regenerated at slightly higher temperatures, allowing for reuse of the sorbent and recovery of mercury for recycling or stabilization.

The disclosed invention is expected to greatly reduce the cost of this mercury control by decreasing the amount of sorbent injected, downsizing sorbent injection equipment, and reducing costs for handling and disposing of spent sorbent. In preferred embodiments, regenerating rather than disposing of spent sorbents is expected to further improve process economics.

The formulation of the sorbents disclosed herein also results in stronger bonding of the mercury to the chemical amendment of the substrate material. The mercury present on used sorbent is thus more difficult to remove, resulting in a final waste form that is more stable and less likely to return the captured mercury to the environment via leaching or other natural processes after disposal.

One object of the invention is to reduce the cost and increase the effectiveness of mercury sorbents and to increase the cost effectiveness of methods and systems for removing mercury from flue gases. Another object of the invention is to prevent contamination of fly ash with activated carbon, thus facilitating its reuse.

In a preferred embodiment, the invention is concerned with a novel mercury sorbent composition. In this embodiment, phyllosilicates having a first layered structure are amended with metal sulfides (e.g., chalcogenides) having a second layered structure, with the open layers of the second layered structure lined with both metal and sulfur ions. While not wishing to be limited by their theory, applicants believe that the layers of the metal sulfides are held together by weak Van der Waals bonds and thus, mercury can enter into these interlayer openings whereas the acid gases are excluded and cannot interfere with the adsorption of mercury. The preferred inter-layer spacing is approximately five nanometers (nm). When the sorbent is used, once mercury has entered the inter-layer spaces, it is retained by interaction with the sulfur-rich environment and amalgamation with the metal ions.

In a preferred embodiment, the invention is concerned with a process for preparing a solid sorbent and product prepared therefrom. The preferred multi-step process includes the steps of obtaining a layered silicate material; performing an ion exchange between the silicate substrate material and a solution containing one or more polyvalent metals from the transition series (e.g., Sn(II), Sn(IV), Fe(II), Fe(III), Ti, Mn, Zn, Mo); washing the impregnated substrate with water; contacting the impregnated and washed substrate with a gas phase or liquid phase source of sulfide; recovering a sulfided substrate (the exchanged polyvalent metal ions precipitate as an insoluble sulfide and become locked in place within the silicate lattice); washing and drying the sulfided substrate; and recovering a high capacity sorbent.

The high capacity sorbent is preferably employed to capture elemental mercury or oxidized mercury species (mercuric chloride) from flue gas and other gases at temperatures from ambient to 350° F. A fixed bed may be employed, or the sorbent may be injected directly into the gas stream.

The sorbent may be regenerated by heating to approximately 500° F. in a fixed bed or fluidized bed. Preferably, an inert gas (e.g., nitrogen) is flowed through the bed to sweep away the desorbed mercury.

Though not wishing to be bound by their theory, applicants believe that the metal sulfides of the invention disclosed herein act as very efficient sorbents for heavy metals such as mercury due to their planar crystal lattice structure. The crystal lattices of the sorbents of the subject invention are arranged in planar arrays creating open layers, lined with sulfur atoms and/or metal ions. The open nature of these layers permits ready access for mercury atoms and ions, but the spacing of the parallel planes is such that acid gases cannot contact the metal sulfide molecules, and therefore do not impact the performance of the sorbent. The sulfur atoms have a strong affinity for mercury, which becomes tightly bound within the crystal lattice. Furthermore, certain metals such as tin and titanium form amalgams with mercury, further enhancing the binding mechanism. In the case of tin (II) sulfide, for example, the interlayer gaps are lined with alternating rows of tin and sulfide atoms. Advantageously, the mercury thus has the potential to bind to every atom of the silicate amendment.

Preferred embodiments of the disclosed compositions comprise transitional metal dichalcogenides (TMDs) and/or polyvalent metal sulfides (PVMS). These TMD and PVMS compounds have a layered structure with opposing sulfur atoms. The gap formed between the layers create an interplanar space, where heavy metals are highly attracted due to the high density of the sulfur atoms. Further, the interlayer spacing is such that acid gas molecules are excluded from the space, and thus cannot impact the performance of the sorbent. This two-dimensional layered structure creates compounds similar in many ways to graphite. Uptake of metals occurs by insertion of the metal within the two-dimensional layered structure in a phenomenon known as intercalation. Intercalation is a chemical insertion reaction by which atoms (generally metals) can be inserted between the layers of two-dimensional layered compounds without altering the basic structure of the host material. Tin and metals in the first few columns of the transition block of the periodic table are capable of forming these layered structures.

Preferred embodiments of the disclosed compositions also comprise a substrate, preferably a phyllosilicate. In phyllosilicate minerals, rings of tetrahedrons are linked by shared oxygens to other rings in a two dimensional plane that produces a sheet-like structure. Typically, the sheets are then connected to each other by layers of cations. These cation layers are weakly bonded and often have water molecules and other neutral atoms or molecules trapped between the sheets. The silicon to oxygen ratio is generally 1:2.5 (or 2:5) because only one oxygen is exclusively bonded to the silicon and the other three are half shared (1.5) to other silicons. The symmetry of the members of this group is controlled chiefly by the symmetry of the rings but is usually altered to a lower symmetry by other ions and other layers; but the overlying symmetry of the silicate sheets will usually still be expressed in a higher pseudo-symmetry. The typical crystal habit of phyllosilicates is flat, platy, book-like and most all members display good basal cleavage. Although members tend to be soft, they are remarkably resilient. Phyllosilicates are also generally tolerant of high pressures and temperatures.

Vermiculite (i.e., hydrated laminar magnesium-aluminum-ironsilicate that resembles mica in appearance) is one preferred sorbent substrate, given its ion exchange capacity, commercial availability, and low cost. Vermiculite is the name applied to a group of magnesium aluminum iron silicate minerals, with a variable composition that may be summarized thus:

$$(Mg, Ca)_{0.7}(Mg, Fe^{3+}, Al)_{6.0}[(Al, Si)_8O_{20}](OH)_4 \cdot 8H_2O$$

Flakes of raw vermiculite concentrate are micaceous in appearance and contain interlayers of water in their structure. When the flakes are heated rapidly, or treated with hydrogen peroxide, the flakes expand, or exfoliate, into accordion-like particles. The resulting lightweight material is chemically inert, fire resistant, and odorless. Vermiculite is widely used in lightweight plaster and concrete, providing good thermal insulation. For this reason, the addition of vermiculite to fly ash materials is not likely to affect the properties of concrete made with it, unlike the addition of carbon to fly ash.

Vermiculite is a phyllo-, or layered silicate with a generalized structure similar to that of talc. It has a central, octahedrally coordinated layer of iron and magnesium oxides lying between two inwardly pointing sheets of silica tetrahedra. In vermiculite, iron and magnesium ions substitute for silicon in the tetrahedral layer and the resulting electrical imbalance is neutralized by loosely bound interlayer ions of calcium, magnesium, or more rarely, sodium. The interlayer space also includes two ordered layers of water molecules. The calcium and magnesium ions within the interlayer space can be replaced by other metal ions to give vermiculite a very high ion-exchange capacity. Vermiculite is not described in the literature as an aluminosilicate.

Montmorillonite is another preferred sorbent substrate. Montmorillonite, also known as smectite, bentonite, or Fuller's Earth, is a clay weathering product of aluminosilicate minerals. These clays typically develop in semi-arid regions from solutions with high concentrations of magnesium ions and can be made synthetically. Montmorillonite is a crypto-crystalline aluminosilicate. Montmorillonite clays are constructed of a single sheet of alumina octahedra, sandwiched between two layers of silica tetrahedra. Substitution of other atoms ($Mg^{2+}$, $Fe^{2+}$, or $Mn^{2+}$) for the aluminum in the octahedral layer or $Al^{3+}$ substitution for silicon in the tetrahedral layer leads to interlayer charge imbalance, producing one excess negative charge for each substituted atom. Cations intercalate into the interlayer areas to balance the charge. Water molecules are also present in the interlayer areas.

The hydrated interlayer space between the sheets is expansible, that is, the separation between the individual smectite sheets varies depending upon the interlayer cations present. Because the interlayer area is hydrated, cations within the interlayer may easily exchange with cations in an external solution, providing that charge balance is maintained. This leads to very high cation exchange capacities in these materials that may be as high as 80–150 mEq/100 g. The availability of the interlayer areas and the very small particle size lead to these clays having extremely large effective surface areas.

The typical particulate size of montmorillonite is in the range of a few microns diameter, which makes it easy to inject and suspend in a flue gas stream, where it is exposed to mercury. By using a particle size that is similar to the fly ash, thorough mixing of the sorbent material into the gas stream is assured. This in turn minimizes the mass of sorbent that is required to achieve mandated mercury removal levels. Its handling and injection into a flue gas stream is similar to that of activated carbon, done with conventional materials handling equipment and requiring residence times for the sorbent on the order of about one second to achieve superior mercury removal from the flue gas stream. The silica content of the montmorillonite renders it easily collectable in an electrostatic precipitator. And that same silica content also renders the collected fly ash and sorbent mixture readily salable as a pozzolan material, a clear advantage over activated carbon.

Allophane is another preferred sorbent substrate. Allophane is a synthetic amorphous aluminosilicate with a high cation exchange capacity. Thus, both natural and synthetic amorphous aluminosilicate materials are preferred as sorbent substrates.

In a preferred embodiment, sorbent preparation is a multi-step process that includes the exchange of metals and addition of sulfide ions to the phyllosilicate substrate material. Preferably, the first step in the preparation of the sorbent is an ion exchange between the phyllosilicate substrate material and a solution containing one or more of a group of polyvalent metals including tin (both Sn(II) and Sn(IV)), iron (both Fe(II) and Fe(III)), titanium, manganese, zirconium and molybdenum, dissolved as salts, such as the sulfate, chloride or nitrate, or as other soluble forms. Ion exchange is preferably performed by suspending or otherwise contacting the phyllosilicate substrate with the solution containing a metal ion for a period of time sufficient to complete the process. Preferably, the solution is stirred or mixed during this time to facilitate the exchange. When the ion exchange is complete, the phyllosilicate substrate material is preferably separated from the solution and may be briefly washed with water. Separation can be accomplished by any number of means, many of which are well established and generally known to those in the field of process engineering. Examples include settling, filtration, and centrifugation. In a preferred embodiment, the metal solution is reused directly or processed to recover unused metal ions.

In a preferred embodiment, contact between the phyllosilicate substrate and the metal ion solution occurs as a multi-step process in which quantities of substrate and solution are sequentially. contacted with each other in stages. This process is preferably performed in either a co-current or counter-current manner.

In a preferred embodiment, the second step in the preparation of the sorbent is the controlled addition of sulfide ions to the phyllosilicate substrate as described below. This is preferably accomplished by contacting the exchanged phyllosilicate substrate with a gas phase or a liquid phase source of sulfide.

Preferable sources of sulfur or sulfide for gas-phase contacting include hydrogen sulfide. Preferable sources of sulfur or sulfide for liquid-phase contacting include sodium sulfide ($Na_2S$) or a compound containing sulfur with different oxidation states, e.g., calcium polysulfide ($CaS_x$). The preferred oxidation state of sulfur species for liquid-phase contacting is minus two. Another option includes dissolving thiourea in water and contacting that solution with the ion-exchanged phyllosilicate. Preferably, excess hydrogen sulfide generated through the addition of sulfide is trapped in an alkaline solution of sodium hydroxide or calcium sulfide for reuse.

Sulfide addition in the liquid phase is preferably accomplished by the incremental addition of a solution containing a sulfide to a liquid containing the phyllosilicate substrate material impregnated with the exchanged polyvalent metal ions. Preferably, during sulfide addition the pH of the liquid is monitored and the acidic pH of the exchanged phyllosilicate is adjusted by the addition of the alkaline sulfide solution to neutrality. Step-wise addition of the sulfide solution is complete when a desired quantity of sulfide is added or when the desired pH is obtained. The sulfurization step is conducted by adding the sulfur source to the metal-impregnated sorbent solution until the pH of the solution is between 6 and 9, and preferably within 7+/−0.5 units. During this process, the exchanged polyvalent metal ions precipitate as an insoluble sulfide and become locked in place within the phyllosilicate lattice. In a preferred embodiment, the amended phyllosilicate is then separated from the solution using a conventional separation technique, e.g., centrifugation, filtration, or flotation, and washed with water (preferably, distilled water). Preferably, the amended phyllosilicate material is then dried using a conventional technique, e.g., electric heat drying, heating in an oven or kiln, vacuum drying, passing a dry, inert gas through the amended phyllosilicate material, or spray drying. Preferably, the amended phyllosilicate material is dried to less than about five percent moisture such that the material is flowable.

In another preferred embodiment, the sorbent disclosed herein is used to absorb elemental mercury or oxidized mercury species such as mercuric chloride from flue gas and other gases at temperatures from ambient to as high as 350° F. In a preferred embodiment, the operational temperature range for the sorption process operating at near ambient pressure conditions is about 350° F. and less. Sorption processes conducted at higher pressures (e.g., at sixty psi) can be operated at temperatures near 500° F. Applicants believe that 350° F. is a likely practical upper limit for the sorption process at atmospheric pressure. Sorbent performance degrades with increasing temperature, and improves with decreasing temperature. The practical lower limit is related to the acid dew point of the gas stream, at which the $SO_2$ in the gas begins to condense to form sulfuric acid. This can become a major corrosion issue in ductwork of a power plant. For high sulfur coals, where $SO_2$ levels can easily be a few thousand ppm, the acid dew point can be in the range 250–270° F. For low-sulfur coals, the $SO_2$ is typically 400 ppm or less, and the acid dew point may be less than 180° F.

Absorption takes place while the sorbent is in contact with the gas. This can occur in a number of conventional process configurations, e.g., injection into the flue gas stream traveling from the economizer to the particulate control equipment or as a fixed bed installed downstream of the particulate control equipment. In a preferred embodiment, the sorbent is contained within a fixed bed in which it is substantially stationary. In this embodiment, contact between the gas and sorbent is achieved as the gas flows through the bed. Applicants believe that a few seconds of contact is adequate. The size of the bed is more typically dependent on how often it is to be changed or regenerated. In a preferred embodiment, an empty bed residence time of less than one second, nominally 0.7 second is provided. Applicants believe that an optimum contact time is 1.5 seconds.

Another process configuration for sorbent use comprises directly injecting and entraining the sorbent into the gas stream. For a coal-fired power plant, sorbent is preferably injected into the gas stream downstream of the boiler and remains in the gas stream until it is removed along with the flyash using an electrostatic precipitator and/or a baghouse. In this configuration, contact is achieved while the sorbent is entrained in the gas and also during the time it is fixed to the separation device. In any configuration, an adequate contact time (preferably at least one or two seconds) is required to ensure proper sorption of the mercury onto or into the sorbent.

In a preferred embodiment, when mercury sorption is complete, the sorbent is stabilized and disposed of using any of a variety of conventional techniques, e.g., landfilled along with the collected fly ash or sold along with the fly ash for use as a.pozzolan additive in concrete. The sorbent may also be regenerated by heating it to about 500° F. and maintaining it at that temperature for a time that is sufficient to desorb the mercury from the sorbent. Preferably, sorbent regeneration occurs in a fixed or fluidized bed. During the regeneration step, an inert gas such as nitrogen is preferably flowed through the bed to sweep desorbed mercury away from the sorbent. Preferably, desorbed mercury is captured for reuse or disposal using any of a variety of conventional techniques, e.g., the mercury can be condensed as the liquid element in a chilled condenser, or captured as mercuric oxide in a chemical wet scrubber. In preferred embodiments, desorption from a fixed bed takes about one-half to one times the total sorption time to which the sorbent has been subjected.

The above description is for a preferred operating mode in which the pressures at which mercury is adsorbed onto and into the sorbent and at which it is desorbed are approximately equal. The adsorption and desorption modes are determined primarily by variations in the sorbent temperature. In another preferred operating mode, the temperatures at which adsorption and desorption occur are essentially equal (and may be very high, e.g., at least 700° F., can be between 500–1000° F. For this case, the adsorption and desorption modes are determined primarily by variations in the operating pressure. This operating mode is referred to as Pressure-Swing-Adsorption (PSA) and is a well-known separation technique. The high-capacity sorbent described herein may be used in either operating mode. In a preferred embodiment, sorbent is used to remove mercury from a gas stream at a gas pressure of sixty pounds per square inch gauge (psig) and a temperature of 500° F. In this embodiment, mercury is released from the sorbent when the pressure is reduced by less than ten percent (five psig) while the same sorption temperature is maintained. Laboratory testing at 4 atmospheres (atm) gauge) indicated that a pressure swing of 0.6 atm was sufficient to cause desorption. Applicants expect typical operation to be in the range of 15–80 atm.

In a preferred embodiment, the invention is a sorbent particle comprising: a vermiculite having a plurality of ion-exchange sites; a plurality of polyvalent metal ions exchanged at some of said ion-exchange sites; and a plurality of sulfide ions chemically reacted to at least some of said polyvalent metal ions. In this embodiment, the sorbent particle is essentially devoid of polysulfides, said sorbent particle has a largest dimension of less than about twenty micrometers and said sorbent particle is operative to capture at least ninety percent of the ionic and elemental mercury present in a flue gas containing acid gases (e.g., $SO_2$, NO and $NO_2$, and/or HCl) to which it is exposed.

In another preferred embodiment, the invention is a sorbent particle comprising: a montmorillonite having a plurality of ion-exchange sites; a plurality of polyvalent metal ions exchanged at some of said ion-exchange sites; and a plurality of sulfide ions chemically reacted to at least some of said polyvalent metal ions. In this embodiment, the sorbent particle is essentially devoid of polysulfides, said sorbent particle has a largest dimension of less than about twenty micrometers and said sorbent particle is operative to capture at least some of the ionic and elemental mercury present in a flue gas containing acid gases to which it is exposed.

In yet another preferred embodiment, the invention is a sorbent particle comprising: a cryptocrystalline phyllosilicate having a plurality of ion-exchange sites; a plurality of polyvalent metal ions exchanged at some of said ion-exchange sites; and a plurality of sulfide ions chemically reacted to at least some of said polyvalent metal ions. In this embodiment, the sorbent particle is essentially devoid of polysulfides, said sorbent particle has a largest dimension of less than about twenty micrometers and said sorbent particle is operative to capture at least some of the ionic and elemental mercury present in flue gas to which it is exposed.

In a further preferred embodiment, the invention is a sorbent comprising: a phyllosilicate having a plurality of ion-exchange sites; a plurality of polyvalent metal ions exchanged at some of said ion-exchange sites; and a plurality of sulfide ions chemically reacted to at least some of said polyvalent metal ions. In this embodiment, the sorbent is operative to accomplish sustained removal of the ionic and elemental mercury present in an acidic flue gas to which it is exposed.

In another preferred embodiment, the invention is a sorbent comprising: a non-zeolitic, amorphous aluminosilicate having a plurality of ion-exchange sites; a plurality of polyvalent metal ions exchanged at some of said ion-exchange sites; and a plurality of sulfide ions chemically reacted to at least some of said polyvalent metal ions. In this embodiment, the sorbent is essentially devoid of copper and polysulfides.

In yet another preferred embodiment, the invention is an adsorbent composition for use in the adsorption of ionic and elemental mercury consisting essentially of: a non-zeolitic aluminosilicate support material having cation sites, the material being selected from the class consisting of vermiculites, allophane and montmorillonites; a cation selected from the group consisting of antimony, arsenic, bismuth, cadmium, cobalt, gold, indium, iron, lead, manganese, molybdenum, mercury, nickel, platinum, silver, tin, tungsten, titanium, vanadium, zinc, zirconium and mixtures thereof wherein the cation occupies some of the cation sites; and a sulfide.

In a further preferred embodiment, the invention is an adsorbent composition for use in the adsorption of ionic and elemental mercury consisting essentially of: a phyllosilicate support material having cation sites, the material being selected from the class consisting of vermiculites and montmorillonites; a cation selected from the group consisting of antimony, arsenic, bismuth, cadmium, cobalt, copper, gold, indium, iron, lead, manganese, molybdenum, mercury, nickel, platinum, silver, tin, tungsten, titanium, vanadium, zinc, zirconium and mixtures thereof wherein the cation occupies some of the cation sites; and a sulfide.

In another preferred embodiment, the invention is a sorbent comprising: a silicate having a first layered structure selected from the group consisting of kaolinite, halloysite, montmorillonite, illite, bentonite, chlorite, and vermiculite; impregnated with a metal sulfide having a second layered structure. In this embodiment, the sorbent is essentially free of polysulfides. Preferably, the metal sulfide is selected from the group consisting of polyvalent metal sulfides.

In another preferred embodiment, the invention is a composition of matter consisting of: a hydrated laminar magnesium aluminum ironsilicate having a plurality of ion-exchange sites; a polyvalent metal ion derived from a highly acidic solution exchanged at some of said ion-exchange sites; and a plurality of sulfide ions chemically reacted to some of said polyvalent metal ions.

In yet another preferred embodiment, the invention is a composition of matter consisting essentially of: montmorillonite having a plurality of ion-exchange sites; a polyvalent metal ion exchanged at some of said ion-exchange sites; and a plurality of sulfide ions chemically reacted to said polyvalent metal ions. In this embodiment, each sulfide ion has the formula $S_x^{-2}$ wherein x is 1.

In another preferred embodiment, the invention is a composition of matter made by combining: phyllosilicate substrate material having a plurality of ion-exchange sites at which cations are exchangeable; a plurality of polyvalent metal ions derived from a highly acidic solution that are exchanged at some of said ion-exchange sites; and a plurality of sulfide ions which are chemically reactable with some of said polyvalent metal ions.

In a further preferred embodiment, the invention is a composition made by combining effective amounts of: means for supporting having a first layered structure and a plurality of ion-exchange sites at which cations are exchangeable; a plurality of polyvalent metal ions which are reversibly substituted at some of said ion-exchange sites; and a plurality of sulfide ions which are chemically reacted to some of said polyvalent metal ions to produce a second layered structure having an inter-layer spacing of about five nanometers. In this embodiment, the composition comprises essentially no polysulfide ions and is capable of removing mercury from a gas stream containing trace amounts of acid gases.

In another preferred embodiment, the invention is a composition made by combining effective amounts of: a synthetic montinorillinite having a plurality of ion-exchange sites at which cations are exchangeable; a plurality of polyvalent metal ions in a highly acidic solution which are reversibly substituted at some of said ion-exchange sites; and a plurality of sulfide ions that are other than copper ions which are chemically reacted to some of said polyvalent metal ions. In this embodiment, the composition is essentially devoid of polysulfide ions and is capable of sorbing mercury from a gas.

In another preferred embodiment, the invention is an adsorbent composition for use in the adsorption of elemental mercury consisting essentially of: a support material selected from the class consisting of phyllosilicates; a cation selected from the group consisting of a bivalent tin ion, a tetravalent tin ion, a bivalent iron ion, a trivalent iron ion, a titanium ion, a manganese ion, a zirconium ion, a vanadium ion, a zinc ion, a nickel ion, a bismuth ion, a cobalt ion, and a molybdenum ion; and a sulfide. In this embodiment, the composition is essentially devoid of polysulfides. Preferably, the phyllosilicate is selected from the class consisting of vermiculite and montmorillinite and the at least one cation is selected from the group consisting of copper, cobalt, manganese, nickel and mixtures thereof.

The invention is also a process and apparatus for preparing the sorbent. In a preferred embodiment, the invention is a process for the preparation of sorbent particles for ionic and elemental mercury comprising: (a) reducing the size of a phyllosilicate support material having cation sites, the material being selected from the class consisting of vermiculites and montmorillonites, to a particle having a largest dimension of less than about twenty micrometers; (b) providing the particle of step (a) with at least one cation capable of forming an insoluble sulfide and selected from the group consisting of antimony, arsenic, bismuth, cadmium, cobalt, gold, indium, iron, lead, manganese, molybdenum, mercury, nickel, platinum, silver, tin, tungsten, titanium, vanadium, zinc, zirconium and mixtures thereof; and (c) contacting the cation-containing particle of step (b) with a solution containing a sulfide-forming species and devoid of a polysulfide-forming species to produce a sorbent particle that is operative to capture at least some of the ionic and elemental mercury present in flue gas containing trace amounts of acid gas species to which it is exposed.

In another preferred embodiment, the invention is a process for the preparation of adsorbent compositions for elemental mercury comprising: providing a support material selected from the class consisting of phyllosilicates with at least one cation capable of forming an insoluble sulfide and selected from the group consisting of antimony, arsenic, bismuth, cadmium, cobalt, gold, indium, iron, lead, manganese, molybdenum, mercury, nickel, platinum, silver, tin, tungsten, titanium, vanadium, zinc, zirconium and mixtures thereof; and contacting the cation-containing support material of the foregoing step with a sulfide-forming species and not a polysulfide-forming species.

In another preferred embodiment, the invention is a process for producing a sorbent particle comprising: reducing the size of a phyllosilicate material (e.g., by grinding or other conventional means) to produce a phyllosilicate particle having a largest dimension of less than about twenty micrometers; contacting (e.g., in a first reactor) the phyllosilicate particle with a highly acidic solution containing a plurality of polyvalent metal ions other than copper ions to produce an exchanged phyllosilicate particle; separating the exchanged phyllosilicate particle from the solution; contacting (e.g., in a second reactor) the exchanged phyllosilicate particle with a fluid containing a plurality of sulfide ions and devoid of polysulfide ions to produce an amended phyllosilicate particle; and separating the amended phyllosilicate particle from the fluid to produce a sorbent particle that is operative to capture at least some of the ionic and elemental mercury present in flue gas to which it is exposed.

In a further preferred embodiment, the invention is a process for producing a sorbent particle comprising: reducing the size of a vermiculite material to produce a vermiculite particle having a first layered structure and a largest dimension of less than about twenty micrometers;

contacting the vermiculite particle with a solution containing a plurality of polyvalent metal ions to produce an exchanged vermiculite particle; separating the exchanged vermiculite particle from the solution; contacting the exchanged vermiculite particle with a fluid containing a plurality of sulfide ions and devoid of polysulfide ions to produce an amended vermiculite particle containing an amendment having a second layered structure; and separating the amended vermiculite particle from the fluid to produce a sorbent particle that is operative to capture at least some of the ionic and elemental mercury present in flue gas to which it is exposed.

In yet another preferred embodiment, the invention is a process for producing a sorbent particle comprising: reducing the size of a montmorillonite material to produce a montmorillonite particle having a largest dimension of less than about twenty micrometers; contacting the montmorillonite particle with a solution containing a plurality of polyvalent metal ions to produce an exchanged montmorillonite particle; separating the exchanged montmorillonite particle from the solution; contacting the exchanged montmorillonite particle with a fluid containing a plurality of sulfide ions and devoid of polysulfide ions to produce an amended montmorillonite particle; and separating the amended montmorillonite particle from the fluid to produce a sorbent particle that is operative to capture at least some of the ionic and elemental mercury present in flue gas to which it is exposed.

In another preferred embodiment, the invention is a process for preparing a sorbent composition comprising: contacting a support material with a highly acidic solution containing at least one cation capable of forming an insoluble sulfide other than a copper sulfide;

contacting the cation containing support of the previous step with a species that is capable of forming a sulfide but not a polysulfide.

In another preferred embodiment, the invention is a process for producing a sorbent comprising: contacting a phyllosilicate substrate material with a solution containing a polyvalent metal ion to produce an exchanged phyllosilicate; separating the exchanged phyllosilicate from the solution; contacting the exchanged phyllosilicate with a fluid containing a sulfide ion other than a polysulfide ion to produce an amended phyllosilicate; separating the amended phyllosilicate from the fluid to produce a sorbent. Preferably, the process further comprises washing the exchanged phyllosilicate after it is separated from the solution and/or washing the amended phyllosilicate after it is separated from the fluid and/or drying the amended phyllosilicate after it is washed and/or processing the solution separated from the exchanged phyllosilicate using a technique selected from the group consisting of reusing the solution, and treating the solution to recover unused metal ions. Preferably, the pyllosilicate substrate material is contacted with a solution containing a polyvalent metal ion selected from the group consisting of a bivalent tin ion, a tetravalent tin ion, a bivalent iron ion, a trivalent iron ion, a titanium ion, a manganese ion, a zirconium ion, a vanadium ion, a zinc ion, a nickel ion, a bismuth ion, a cobalt ion, and a molybdenum ion. Preferably, the exchanged phyllosilicate is separated from solution using settling, flotation, filtration, and centrifugation. Preferably, the phyllosilicate substitute material is contacted with the solution using consisting of batch contacting, co-current contacting, and/or counter-current contacting. Preferably, the exchanged phyllosilicate is contacted with a fluid selected from the group consisting of a gas phase source of sulfide, and a liquid phase source of sulfide. Preferably, the exchanged phyllosilicate is contacted with hydrogen sulfide gas. Preferably, the exchanged phyllosilicate is contacted with a solution containing a source of sulfide ions selected from the group consisting of sodium sulfide, sodium bisulfite, potassium sulfide, calcium sulfide, calcium polysulfide, ammonium sulfide, and another compound containing sulfur in the sulfide state. Preferably, the fluid is an aqueous solution and the process further comprises: adjusting the pH of the aqueous solution to a pH of in the range of 6 to 9 and more preferably, the pH is adjusted to within approximately plus or minus 0.5 pH units of pH 7.

In another preferred embodiment, the invention is a sorbent production system comprising: means for contacting a silicate substrate material with a solution containing a polyvalent metal ion other than a copper ion to produce an exchanged silicate; means for separating the exchanged silicate from the solution; means for contacting the exchanged silicate with a fluid containing a sulfide ion being devoid of a polysulfide ion to produce an amended silicate; means for separating the amended silicate from the fluid to produce a sorbent.

The invention is also a method and system for removing mercury from a gas stream. In a preferred embodiment, the invention is a method for removing mercury from a gas stream containing an acid gas, the method comprising: injecting and entraining a sorbent particle disclosed herein into the gas stream containing ionic and elemental mercury under conditions wherein at least a portion of said elemental and ionic mercury sorbs onto the collected sorbent particle during its exposure to the gas stream; and removing the sorbent particle from the gas stream. Preferably, the removing step is accomplished by means of a process selected from the group consisting of filtration, electrostatic precipitation, an inertial method, and wet scrubbing.

In a preferred embodiment, the invention is a method for removing mercury from a gas stream, the method comprising: injecting and entraining a sorbent particle disclosed herein into the gas stream containing ionic and elemental mercury under conditions wherein at least a portion of said elemental and ionic mercury sorbs onto the collected sorbent particle during its exposure to the gas stream; and removing the sorbent particle from the gas stream by means of a process selected from the group consisting of filtration, electrostatic precipitation, an inertial method, and wet scrubbing. Preferably, the injecting and entraining step involves injecting and entraining the sorbent particle into a flue gas stream containing a plurality acid gases including sulfur dioxide ($SO_2$) in the range of a few hundred to a few thousand parts per million (ppm), hydrogen chloride (hydrochloric acid, HCl) up to 100 ppm, and nitrogen oxides (e.g., $NO_2$) in the range of 200 to 2,000 ppm.

In a preferred embodiment, the invention is a process for removing mercury from a gas, the process comprising: contacting the gas containing mercury with a sorbent produced using a process disclosed herein.

In a preferred embodiment, the invention is a technique for removing mercury from a gas, the technique comprising: contacting a sorbent disclosed herein with a gas stream containing mercury at a temperature that does not exceed 350 degrees Fahrenheit for at least one second; removing the sorbent from the gas stream; and heating the sorbent to a temperature of about 500 degrees Fahrenheit to desorb the adsorbed mercury from the sorbent and produce a regenerated sorbent; and removing the adsorbed mercury from the vicinity of the regenerated sorbent.

In yet another preferred embodiment, the invention is a method for removing mercury from a gas, the method comprising: flowing the gas containing mercury through a fixed or fluidized bed comprised of a sorbent disclosed herein.

In a further preferred embodiment, the invention is a method for removing mercury from a gas, the method comprising: injecting and entraining a sorbent disclosed herein into a gas stream containing mercury at an operating pressure within about plus or minus 0.5 to 1.0 psig of ambient conditions; and removing the sorbent from the gas stream by filtration, electrostatic precipitation, inertial methods, and/or wet scrubbing. Preferably, at least a portion of said sorption occurs onto the collected sorbent while it remains exposed to the gas stream.

In a preferred embodiment, the invention is a system for removing mercury from a gas, the system comprising: means for flowing the gas containing mercury through a bed comprising of a sorbent described herein operating at gas temperatures greater than 500 degrees Fahrenheit and pressures greater than ambient conditions; and means for removing the mercury from the sorbent by reducing the operating pressure of the sorbent container, while maintaining the temperature of the sorbent at or near the normal operating temperature for the process.

In a preferred embodiment, the invention is a system for removing mercury from a gas, the system comprising: an injector for injecting a sorbent disclosed herein into a flue gas stream; a contactor for contacting the sorbent with the flue gas stream and producing a mercury-laden sorbent; and a separator for separating the mercury-laden sorbent from the flue gas stream. Preferably, the system further comprises: a regenerator for regenerating the mercury-laden sorbent.

In another preferred embodiment, the invention is a system for removing mercury from a flue gas, the system comprising: a source of flue gas that contains an acid gas (e.g., a power plant); means for exposing (e.g., an injection and entrainment system, a fixed bed or a fluidized bed) the flue gas to a sorbent disclosed herein. Preferably, if an injection and entrainment system is the selected means for exposing, the system also comprises means for separating the sorbent from the flue gas after the sorbent has contacted the flue gas for a time that is effective for the sorbent to capture mercury present in the flue gas.

Another preferred embodiment of the invention is a system for removing mercury from a gas, the system comprising: means for injecting a sorbent disclosed herein into a flue gas stream; means for contacting the sorbent with the flue gas stream and producing a mercury-laden sorbent; and means for separating the mercury-laden sorbent from the flue gas stream.

Another preferred embodiment of the invention is a method for removing mercury from a gas, the method comprising: a step for injecting a sorbent disclosed herein into a flue gas stream; a step for contacting the sorbent with the flue gas stream and producing a mercury-laden sorbent; and a step for separating the mercury-laden sorbent from the flue gas stream.

Another preferred embodiment of the invention is a facility that produces a flue gas that incorporates a system for removing mercury disclosed herein or a method of operating a facility that produces a flue gas in accordance with a method for removing mercury disclosed herein. In a preferred embodiment, the invention is a power plant comprising a system disclosed herein or a method for operating a power plant in accordance with a method disclosed herein. In another embodiment, the invention is a power grid energized at least in part by a power plant comprising a system for removing mercury disclosed herein. In another preferred embodiment, the invention is an incinerator comprising a system disclosed herein or a method for operating an incinerator in accordance with a method disclosed herein.

In another preferred embodiment, the invention is a concrete additive comprising a fly ash containing a sorbent disclosed herein that has been used to remove mercury from a gas stream and is mercury laden. In yet another embodiment, the invention is a method for making a concrete additive that comprises adding to a cement and aggregate mixture a fly ash containing a sorbent disclosed herein that has been used to remove mercury from a gas stream. In another embodiment, the invention is a concrete made by combining a cement, an aggregate and a fly ash containing a sorbent disclosed herein that has been used to remove mercury from a gas stream.

Further aspects of the invention will become apparent from consideration of the drawings and the ensuing description of preferred embodiments of the invention. A person skilled in the art will realize that other embodiments of the invention are possible and that the details of the invention can be modified in a number of respects, all without departing from the concept. Thus, the following drawings and description are to be regarded as illustrative in nature and not restrictive.

BRIEF DESCRIPTION OF THE SEVERAL VIEWS OF THE DRAWINGS

The features of the invention will be better understood by reference to the accompanying drawings which illustrate presently preferred embodiments of the invention. In the drawings.

Figure 1:
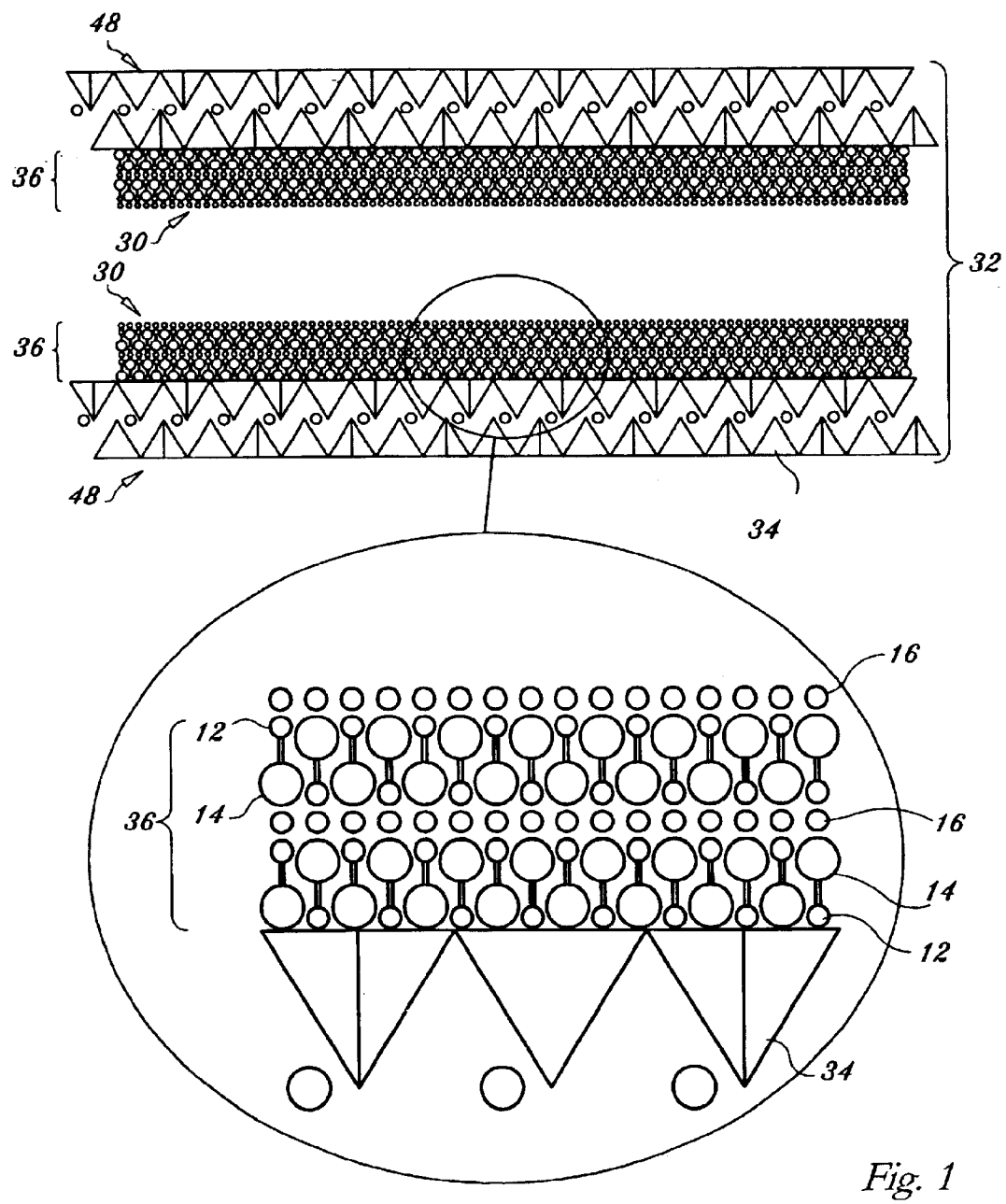
FIG. 1 is a schematic diagram that illustrates the geometry of the capture mechanism of a preferred embodiment of the invention.

The following reference numerals are used to indicate the parts and environment of the invention on the drawings:

12 metal atoms or ions, tin atoms or ions
14 sulfur atoms or ions
16 mercury atoms or ions
30 sulfide amendment
32 first layered structure
34 silicate tetrahedral structure
36 second layered structure
48 silicate substrate material, silicon substrate, substrate
56 countercurrent reactor
58 depleted solution
60 ion-exchanged substrate
62 metal solution
74 final product, sorbent
80 flue gas, other gas
82 contacting step
84 separation step
86 mercury-laden sorbent
88 sorbent regeneration step
90 mercury
92 mercury-laden sorbent stabilization and disposal step
110 power plant or incinerator
112 coal
114 boiler
116 generator
118 power grid
122 flue gas
124 sorbent injection system
126 particulate removal system
128 disposal site
130 baghouse
132 spend sorbent disposal/mercury recovery system
134 stack

DETAILED DESCRIPTION OF THE INVENTION

Referring to FIG. 1, in a preferred embodiment, sorbent 74 of the disclosed invention is a particle comprising: a phyllosilicate having a plurality of ion-exchange sites (e.g., vermiculite or montmorillinite); a plurality of polyvalent metal ions exchanged at some of the ion-exchange sites; and a plurality of sulfide ions chemically reacted to at least some of the polyvalent metal ions. Preferably, the sorbent particle is essentially devoid of polysulfides, has a largest dimension of less than about twenty micrometers and is operative to capture at least some of the ionic and elemental mercury present in flue gas to which it is exposed. Specifications and sources of starting materials for preferred embodiments of the invention are presented in Table 1.

TABLE 1

Specifications and sources for preferred starting materials

| Input Material | Specifications | Sources |
| --- | --- | --- |
| Vermiculite | see WWW domain: amverco.com | American Vermiculite Corporation Kennesaw, GA |
| Montmorillonite | Clays: Hectorite/SHCa-1, Na-Montmorillonite/ SWy-1(SWy-2), Barasym/SSM-100 Syn-1 | Clay Minerals Society Source Clays Repository University of Missouri, Columbia, MO; see WWW domain: cms.lanl.gov |

TABLE 1-continued

Specifications and sources for preferred starting materials

| Input Material | Specifications | Sources |
|---|---|---|
| Bentonite | Bara-Kade/Standard Bentonite Soil Sealing Grade - 200 mesh | Bentonite Performance Minerals, Denver, Colorado |
| Sodium Sulfide | Anhydrous or nanohydrate | Sigma-Aldrich, Milwaukee, WI |
| ($Na_2S$) | Varying purity | Alfa Aesar, Ward Hill, MA |
| Calcium polysulfide ($CaS_x$) | Cascade Aqueous Solution About 30% $CaS_x$ by weight | Best Sulfur Products Fresno, CA |
| Tin(II) Chloride | Anhydrous or dehydrate | Sigma-Aldrich, Milwaukee, WI |
| ($SnCl_2$) | Varying purity | Alfa Aesar, Ward Hill, MA |
| Ti(III) Chloride | Aqueous solution, | Sigma-Aldrich, Milwaukee, WI |
| $TiCl_3$ | ca. 10%–20% by weight | Alfa Aesar, Ward Hill, MA |
| Fe(II) Chloride | Anhydrous or hydrated | Sigma-Aldrich, Milwaukee, WI |
| ($FeCl_2$) | Varying purity | Alfa Aesar, Ward Hill, MA |
| Fe(II) Sulfate | Anhydrous or heptahydrate | Sigma-Aldrich, Milwaukee, WI |
| ($FeSO_4$) | Varying purity | Alfa Aesar, Ward Hill, MA |
| Fe(III)Chloride | Anhydrous or hexahydrate | Sigma-Aldrich, Milwaukee, WI |
| $FeCl_3$ | Varying purity | Alfa Aesar, Ward Hill, MA |

Sulfide amendment 30 with intercalated mercury 16 is shown attached to silicate tetrahedral structure 34 of substrate 48 in FIG. 1, which applicants' believe schematically illustrates the geometry of the capture mechanism of a preferred embodiment of the invention. In this embodiment, phyllosilicates having first layered structure 32 are amended with metal sulfides (e.g., chalcogenides) having second layered structure 36, which comprise open layers of the chalcogenides lined with both metal atoms 12 and sulfur atoms 14. In the preferred embodiment illustrated in schematic cross section in FIG. 1, the layers of the tin (Sn) ions or atoms 12 and sulfur (S) ions or atoms 14 (that together form the metal sulfide of this embodiment, tin II sulfide) are held together by weak Van der Waals bonds and thus, mercury ions or atoms 16 can enter into interlayer openings whereas acid gases are excluded and cannot interfere with the adsorption of mercury ions or atoms 16. The preferred inter-layer spacing is approximately five nanometers (nm). When sorbent 74 is used, after mercury ion atoms 16 have entered the inter-layer spaces, they are retained by interaction with the sulfur-rich environment and amalgamation with the metal atoms.

In a preferred embodiment, sorbent preparation is a multi-step process that includes the exchange of metals and addition of sulfide ions to silicate substrate material 48. Preferably, the first step in the preparation of the sorbent is an ion exchange step in which an ion exchange occurs between silicate substrate material 48 and a solution containing one or more of a group of polyvalent metals including tin (both Sn(II) and Sn(IV)), iron (both Fe(II) and Fe(III)), titanium, manganese, zirconium and molybdenum, dissolved as salts, such as the sulfate, chloride or nitrate, or as other soluble forms. The ion exchange step is preferably performed by suspending or otherwise contacting silicate substrate material 48 with the solution containing a metal ion for a period of time sufficient to complete the process step. Preferably, the solution is stirred or mixed during this time to facilitate the exchange.

When the ion exchange step is complete, the exchanged silicate substrate material is preferably separated from the solution and briefly washed with water in an exchanged silicate separation and washing step. Separation can be accomplished by any number of means, many of which are well established and generally known to those in the field of process engineering. Examples include settling, filtration, and centrifugation. In a preferred embodiment, the metal solution is reused directly or processed to recover unused metal ions.

Figure 2:
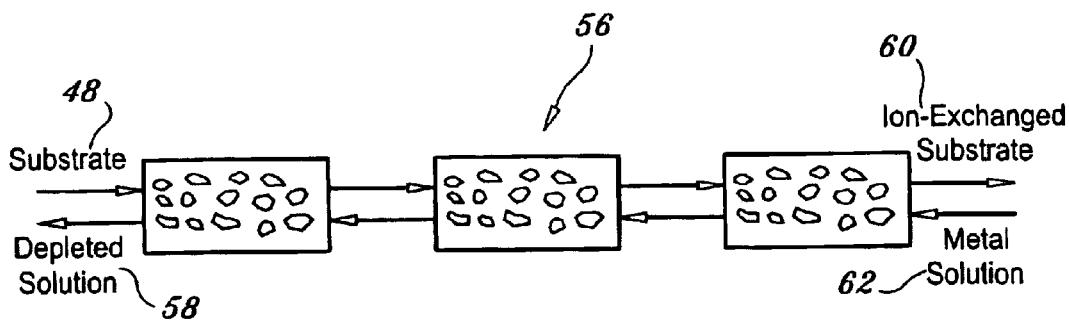
FIG. 2 is a schematic process flow diagram of a preferred embodiment of a counter-current ion exchange step.

In a preferred embodiment, contact between silicate substrate 48 and the metal ion solution occurs as a multi-step process in which quantities of substrate and solution are sequentially contacted with each other in stages. This process is preferably performed in either a co-current or counter-current manner. As illustrated in FIG. 2, when countercurrent contact is utilized, substrate 48 is introduced to counter-current reactor 56 at the same end that depleted solution 58 is withdrawn from counter-current reactor 56. Ion-exchanged substrate 60 is removed from counter-current reactor 56 at the same end that metal solution 62 is introduced to counter-current reactor 56.

In a preferred embodiment, the second step in the preparation of the sorbent is a controlled sulfide addition step in which sulfide ions from sulfide source 66 are added to ion-exchanged silicate substrate 60 as described below. This is preferably accomplished by contacting ion-exchanged silicate substrate 60 with a liquid phase source of sulfide.

Preferable sources for sulfur or sulfide for liquid-phase contacting include sodium sulfide ($Na_2S$) or a compound containing sulfur with different oxidation states, e.g., calcium polysulfide ($CaS_x$) or thiourea.

When accomplished in the liquid phase, the controlled sulfide addition step is preferably accomplished by the incremental addition of a solution containing a sulfide to a liquid containing ion-exchanged silicate substrate material 60 containing the exchanged polyvalent metal ions. Preferably, during sulfide addition the pH of the liquid is monitored and the acidic pH of the exchanged silicate is adjusted by the addition of the alkaline sulfide solution to neutrality during a pH monitoring/adjustment step. Stepwise addition of the sulfide solution is complete when a desired quantity of sulfide is added or when the desired pH is obtained. During this process step, the exchanged polyvalent metal ions precipitate as an insoluble sulfide and become locked in place within the silicate lattice. In a preferred embodiment, the amended silicate is then separated from the solution using a conventional separation technique and washed with water or other appropriate liquids during an amended silicate separation and washing step. Preferably, the amended silicate material is then dried using a conventional technique in an amended silicate drying step to produce final product or sorbent 74.

Figure 3:
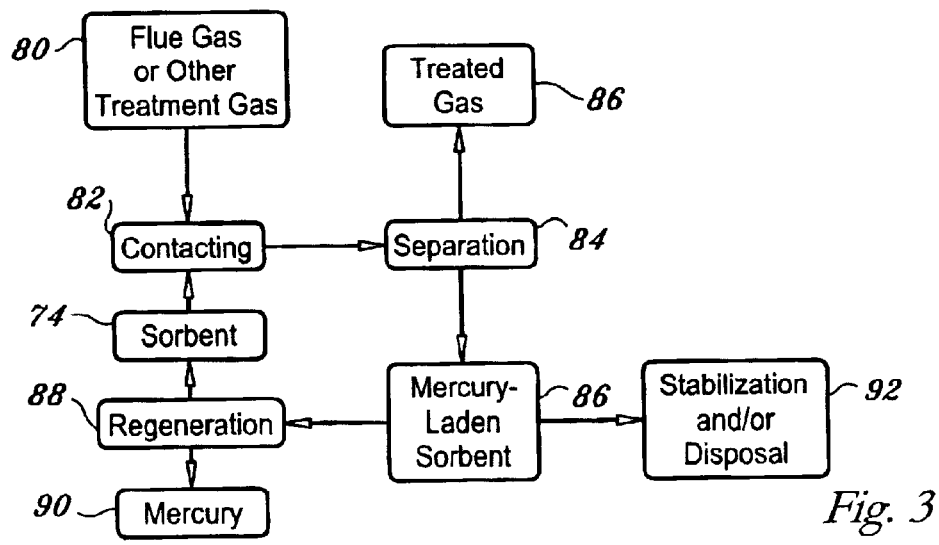
FIG. 3 is a schematic flow diagram of a preferred embodiment of a flue gas or other gas treatment process.

Referring to FIG. 3, sorbent 74 is used to absorb elemental mercury or oxidized mercury species such as mercuric chloride from flue gas and other gas 80 during contacting step 82 at temperatures from ambient to as high as 350° F. Absorption takes place while the sorbent is in contact with the gas. This can occur in a number of conventional process configurations. In a preferred embodiment, the sorbent is contained within a fixed bed in which it is substantially stationary. In this embodiment, contact between the gas and sorbent is achieved as the gas flows through the bed.

Another process configuration for use of sorbent 74 comprises directly injecting and entraining the sorbent into the gas stream. For a coal-fired power plant, sorbent 74 is preferably injected into the gas stream downstream of the boiler and remain in the gas stream until it is removed along with the flyash using an electrostatic precipitator and/or a baghouse in separation step 84. In this configuration, contact step 82 occurs while sorbent 74 is entrained in gas 80 and also during the time it is fixed to the separation device in separation step 84. In any configuration, an adequate contact time (preferably at least one or two seconds) is required to ensure proper sorption of the mercury onto or into sorbent 74 before treated gas 86 is released.

In a preferred embodiment, when mercury sorption is complete, mercury-laden sorbent 86 is stabilized and disposed of during mercury-laden sorbent stabilization and disposal step 92 using any of a variety of conventional techniques. Mercury-laden sorbent 86 may also be regenerated in regeneration step 88 by heating it to about 500° F. and maintaining it at that temperature for a time that is sufficient to desorb mercury 90 from sorbent 74. Preferably, sorbent regeneration step 88 occurs in a fixed or fluidized bed. During regeneration step 88, an inert gas such as nitrogen is preferably flowed through the bed to sweep desorbed mercury 90 away from sorbent 74. Preferably, desorbed mercury 90 is captured for reuse or disposal using any of a variety of conventional techniques.

The above description is for a preferred operating mode in which the pressures at which mercury is adsorbed onto and into sorbent 74 and at which it is desorbed are approximately equal. The adsorption and desorption modes are determined primarily by variations in the sorbent temperature. In another preferred operating mode, the temperatures at which adsorption and desorption occur are essentially equal (and may be very high, e.g. 700° F. For this case, the adsorption and desorption modes are determined primarily by variations in the operating pressure. This operating mode is referred to as Pressure-Swing-Adsorption (PSA) and is a well-known separation technique. High-capacity sorbent 74 described herein may be used in either operating mode.

Figure 4:
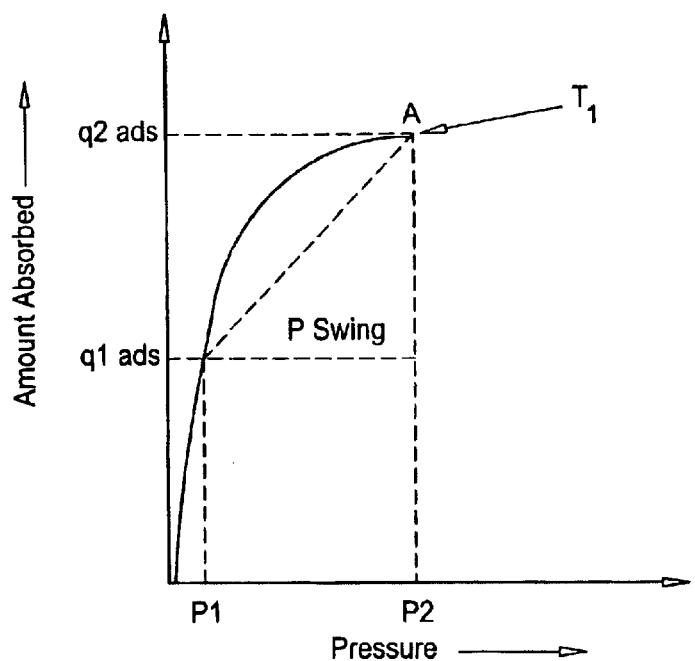
FIG. 4 is an illustration of the operation of the Pressure Swing Adsorption step of a preferred embodiment of the invention.

At higher partial pressure, a gas (e.g., gaseous mercury) is more strongly adsorbed onto a solid surface (e.g., of an adsorbent). As illustrated in FIG. 4, the Pressure Swing Adsorption (PSA) process step of a preferred embodiment of the invention relies on the fact that one can create higher partial pressure by increasing the total system pressure. More adsorbate (e.g., gas-phase mercury) is adsorbed at higher pressure and, when the pressure is reduced, the adsorbate is released, or desorbed. Unlike the more common temperature-swing adsorption, PSA can be run at constant temperature. Compared to temperature swing adsorption, PSA can be cycled more rapidly, and typically requires less energy for regeneration. PSA is commonly used for air separation and purification and recovery of hydrogen and hydrocarbons from gas streams (Jasra, R. V. et al., "Separation of Gases by Pressure Swing Adsorption," *Separation Sciences and Technology*, 26, 885–930, 1991).

FIG. 4 depicts how the pressure swing adsorption step is applied in the disclosed invention. A gas containing some component X (e.g., mercury) is contacted with an adsorbent at temperature $T_1$ and pressure $P_2$. The amount of X adsorbed is given by $q_{ads2}$. The absorbent is then regenerated by dropping the pressure to $P_1$, holding the temperature constant. The new equilibrium capacity is given by $q_{ads1}$, where $q_{ads1} < q_{ad2}$. The shape of the isotherm governs the concentration ratio that can be achieved in pressure-swing systems. Ideally, the process step is run in a regime where the isotherm is steep, that is, fairly low adsorbate loadings. In reality, pressure-swing systems are never truly isothermal because of heat of adsorption effects.

The disclosed amended silicate sorbent 74 is suitable for use in a pressure-swing adsorber designed to remove mercury from the high-temperature, high-pressure conditions found in gases produced in a gasifier. As illustrated in FIG. 4, in pressure-swing adsorption the contaminant is adsorbed at high pressure, P2, on sorbent 74. System pressure is then reduced to P1, holding the temperature constant at T1. At P1 sorbent has a lower capacity for the contaminant ($q_{1ads} < q_{2ads}$), and the contaminant desorbs, regenerating the sorbent.

Figure 5:
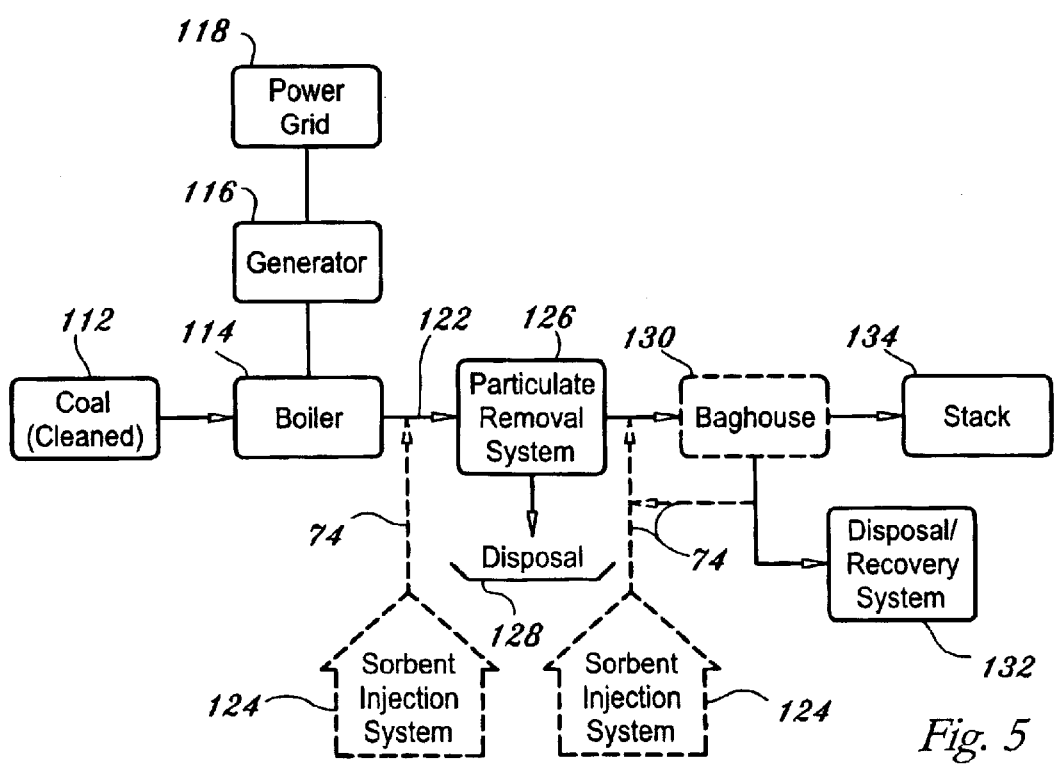
FIG. 5 is a block diagram of a preferred embodiment of the invention.

Referring to FIG. 5, another preferred embodiment of the invention is presented. In this embodiment, sorbent 74 is used to remove mercury from the flue gas of a power plant or an incinerator. In the instance of a power plant, coal 112 is burned in boiler 114 to produce steam that powers generator 116 which produces electricity that energizes power grid 118. Boiler 114 produces flue gas 122. In one embodiment, sorbent injection system 124 injects sorbent 74 into flue gas 122 before it is introduced into particulate removal system 126. Particulate removal system 126 may comprise an electrostatic precipitation system, a baghouse and/or a cyclone. In one embodiment, particulates, including particles of sorbent 74 are removed from flue gas 122 and disposal of at disposal site 128.

In another preferred embodiment, sorbent injection system 124 injects sorbent 74 into flue gas 122 after it has passed through particulate removal system 126 and before it is introduced into baghouse 130. In this embodiment, mercury-laden sorbent 86 captured in baghouse 130 is processed in spent sorbent disposal/mercury recovery system 132. In a preferred embodiment, regenerated sorbent 74 is reinjected into flue gas 122 by sorbent injection system 124. Flue gas 122 that has been treated for mercury removal is discharged from stack 134.

Working Example

Preferred embodiments of the sorbents disclosed herein were tested for mercury uptake using a sorbent test fixture. The test fixture consisted of an electric tube furnace for controlling the temperature of the sorbent chamber, several mass flow controllers to blend trace-gas constituents such as sulfur dioxide, hydrogen chloride, and nitrogen oxides into the test gas, a water chamber to humidify the test gas, and a continuous mercury monitor to measure mercury concentration at inlet and outlet of the sorbent chamber. The mercury monitor allowed the breakthrough of mercury to be followed during sorption tests in real-time.

Mercury permeation tubes were used as the mercury source for the sorption tests. Permeation tubes were made of ¼" Teflon™ or silicone tubing with liquid elemental mercury inside. Caps were used on the ends of the tubing to contain the mercury. The length of the tube varied depending on the desired mercury emission. A tube was placed in a larger stainless steel tube and maintained at a desired temperature inside a laboratory oven. A stream of dry nitrogen gas flowed through the stainless steel tube to transport the mercury-containing gas to a manifold, where it was mixed with the other gases to create the sorption test gas. The ultimate mercury concentration was determined by the mercury permeation rate through the porous Teflon™ and total gas flow rate. For these tests, the mercury concentration varied between 30 to 80 $\mu g/m^3$, depending on the test. Tests conducted with vapor-phase mercuric chloride used a similar permeation tube with mercuric chloride crystals to dope the carrier gas with mercuric chloride vapors.

The emission rate of mercury through the tube wall was a function of the tube's geometry and the temperature at which the tube was stored. During the tests, more than thirty tubes were stored in temperature-controlled ovens. Each month the tubes were weighed to determine the amount of mercury loss. After several months, the average weight loss over time was accurately known. Emission rates were presented as nanograms of mercury per minute.

Mercury concentration in the test gas entering and leaving the test fixture was monitored using a mercury analyzer. The analyzer operates on the principle of atomic absorption of ultraviolet (UV) light by vapor-phase elemental mercury. The amount of UV absorption is proportional to the mercury concentration in the gas stream.

Other gases, such as sulfur dioxide, also absorb UV light at the same wavelength as mercury. Because these gases absorb light over a wide range of wavelengths, they are called broadband absorbers (BBAs). When sorbent tests was conducted with sulfur dioxide in the test gas, it was necessary to account for the UV absorption by these BBAs to accurately measure changes in the mercury concentration of the test gas. A spectral line-splitting method known as the Zeeman Effect was used to generate two polarized components of the UV light source. Mercury absorbs only one of these components, whereas the BBA gases absorb light of both components. This light-splitting process was accomplished by placing a mercury lamp in a strong magnetic field to produce a 2536-Angstrom centerline wavelength with sidebands emissions that are displaced by +/−0.01 Angstroms. The light emitted from the magnetic field was then passed through a rotating polarizing lens that produces alternate pulses of the polarized light. An on-board computer algorithm determined the UV light absorption due to mercury only and calculated the mercury concentration in the gas stream.

Mercury uptake was determined by monitoring the mercury loss through the sorbent chamber. The inlet mercury concentration was modeled as a constant, assuming that the mercury source did not change with respect to time. However, the outlet mercury concentration from the sorption chamber was not steady, and was, therefore, a time-dependent variable. Data from the mercury analyzer was recorded every thirty seconds by the analyzer computer. The outlet mercury concentration data were integrated over the sorption cycle to determine amount of mercury removed by the sorbent.

Mercury uptake by the sorbents was calculated using the following equation:

$$q = \frac{Q}{m}\left[C_{in}(t_2 - t_1) - \int_{t1}^{t2} C(t)_{out}\, dt\right]$$

where q is the amount of mercury adsorbed by the sorbent per weight of sorbent, Q is the volumetric gas flow rate, m is the weight of sorbent, $C_{in}$ and $C(t)_{out}$ are the inlet and outlet mercury concentrations, respectively, and $t_2$ and $t_1$ define the starting and ending times of the sorption cycle.

The weight of sorbent used in the mercury uptake calculation is somewhat arbitrary, but for purposes of these tests, weight of sorbent was defined as the weight of the sorbent material. In the case of activated carbon, all material participates in the sorption process. Therefore, the weight of sorbent is the weight of activated carbon used in the sorption test. For comparative purposes, mercury uptake for the amended phyllosilicate sorbents was also based on weight of the vermiculite sorbent used in the sorption tests.

Several batches of the vermiculite sorbents chemically amended in accordance with the disclosed invention were prepared and tested for vapor-phase mercury removal. Initially, only metals having a +4 oxidation state were considered in order to generate disulfide metal sorbents. The selection of candidate metals was limited however to only three water-soluble metals salts. They were titanium tetrachloride ($TiCl_4$), stannic chloride ($SnCl_4$), and zirconium sulfate ($ZrSO_4$). $MoS_2$ was not prepared in this manner since no soluble +4 molybdenum salt is available. Due to the explosive interaction of $TiCl_4$ with water, titanium trichloride was used instead. The scope of sorbent preparation was later expanded to include metal ions with other oxidation states to prepare sorbents from solutions of zinc sulfate, stannous chloride, molybdenum (VI) oxide, and iron (III) chloride.

In these sorbent tests, a 3.4-gram sample of the sorbent was placed in the sorbent tube with glass wool plugs above and below the sorbent bed to hold it in position. The sorbent tube was connected into the sorption test chamber plumbing and heated to 280° F. Hot nitrogen gas flowed through the sorbent test chamber while the equipment was heated. Mercury uptake tests were conducted with elemental mercury in nitrogen. Table 2 lists the test conditions and mercury uptake results from these tests. Runs were also conducted with virgin (untreated) vermiculite to determine the mercury capacity of the substrate material. For comparison, the initial mercury breakthrough capacity for Darco® activated carbon was determined to be 6 $\mu$g/g carbon.

TABLE 2

Summary of Test Conditions and Results for Metal Sulfide Sorbents

| Test No. | Sorbent Type | Mercury Conc. ($\mu$g/m$^3$) | Initial Breakthrough Time | Mercury Loading ($\mu$g/g) |
|---|---|---|---|---|
| 1 | Virgin Vermiculite | 44 | Immediate | 0 |
| 2 | Virgin Vermiculite | 58 | Immediate | 0 |
| 3 | Virgin Vermiculite | 45 | Immediate | 0 |
| 4 | $Mo_2S_3$ | 55 | 1 hour | 0.5 |
| 5 | $ZrS_2$ | 38 | 11 minutes | 0.1 |
| 6 | $SnS_2$ | 32 | 3.3 hours | 0.9 |
| 7 | ZnS | 49 | 11 minutes | 0.1 |
| 8 | $Ti_2S_3$ | 57 | No breakthrough in 24 hours | 12.0 (first cycle) |
| 9 | $Ti_2S_3$ | 53 | No breakthrough in 24 hours | 11.2 (second cycle) |
| 10 | SnS | 47 | No breakthrough in 54 hours | 22.4 (Batch #1) |
| 11 | SnS | 58 | 8 hours | 4.1 (Batch #2) |
| 12 | FeS | 45 | 6 hours | 2.4 |

As expected, the virgin vermiculite had virtually no affinity for mercury; mercury broke through the vermiculite bed almost immediately. Likewise, the metal sulfide sorbents prepared with $Mo_2S_3$, $ZrS_2$, $SnS_2$, ZnS, and FeS showed very little to moderate uptake of mercury. The low uptake of mercury for the $ZrS_2$ and $SnS_2$ was surprising since these compounds are dichalcogenides. Applicants suspect that insufficient sulfur was incorporated into the vermiculite sorbents during the sulfurization step of the sorbent preparation procedure.

Figure 6:
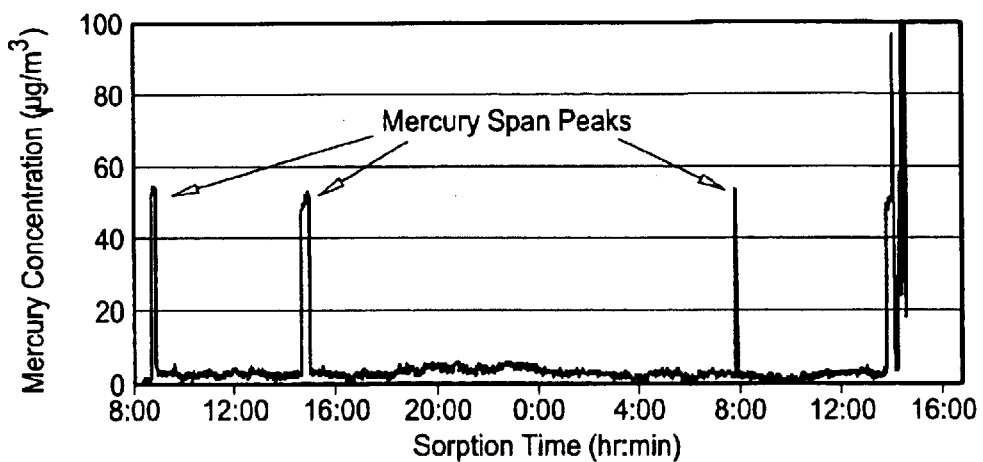
FIG. 6 is a graph presenting the results of testing of an embodiment of the invention that comprised $Ti_2S_3$ sorbent.
Figure 7:
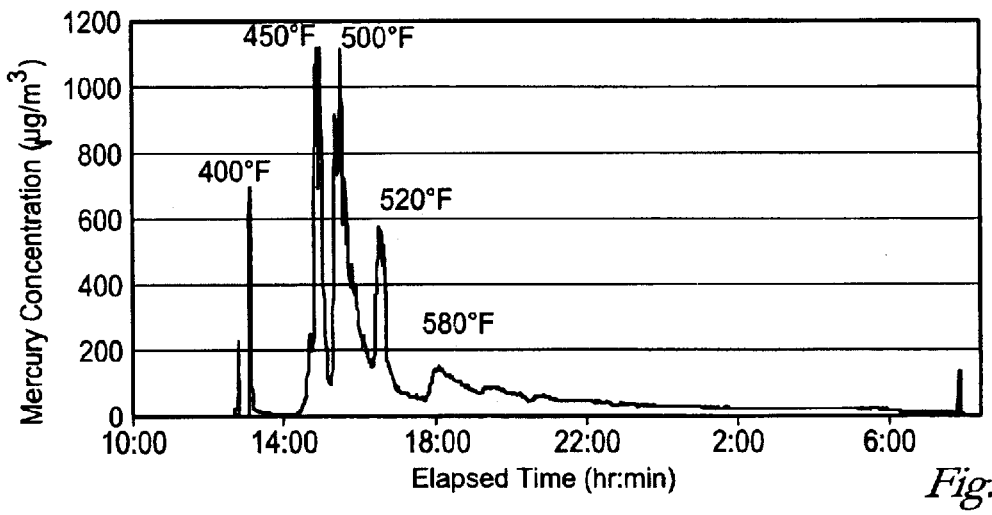
FIG. 7 is a graph presenting the results of $Ti_2S_3$ sorbent regeneration.

Unexpected results were obtained with the $Ti_2S_3$ sorbent, which had exceptional mercury uptake. The titanium sulfide sorbent was used for two 24-hour sorption cycles. The mercury concentration at the outlet of the sorbent bed for the first sorption cycle is shown in FIG. 6. Virtually all of the mercury was removed from the gas stream. Fluctuations in the analyzer response were due mainly to thermal drift. After the first sorption cycle, the sorbent was regenerated with hot nitrogen gas flowing through the sorbent bed, heating it to a temperature of 580° F. The evolution of captured mercury is shown in FIG. 7 as the temperature was incrementally increased. The sorbent was heated for two reasons: first, to confirm that the sorbent had indeed removed a significant quantity of mercury; and second, to determine if the sorbent was capable of regeneration—that is, if the regenerated material showed the capacity to remove additional mercury upon exposure in another sorption cycle. The regenerated sorbent was tested in a second sorption cycle for 24 hours. No mercury breakthrough was detected in either the first or second sorption cycles. Regeneration temperatures are indicated above the mercury peaks in FIG. 7.

The sorption results for the SnS sorbent were also promising. The first test ran over a weekend and was finally stopped after fifty-four hours. During that time, the mercury concentration in the outlet gas from the sorbent bed was below the detection limit of the mercury analyzer, indicating that virtually all mercury in the test gas was removed by the sorbent. The amount of mercury taken up by the SnS sorbent in this cycle was roughly three times the amount of mercury sorbed onto carbon based on initial breakthrough. The sorption test was later repeated with a new batch of SnS sorbent. In the second sorption test, the sorbent lasted for only eight hours before mercury broke through the sorbent bed.

The wide variation in the mercury uptake in the two tests was thought to be due to different amounts of metal sulfide deposited on the vermiculite substrate in the two batches of sorbent. This result presented strong evidence that refinements to the sorbent preparation method could reduce the variability associated with the metal-ion exchange and subsequent sulfurization steps. However, the results also strongly suggest that greater mercury loadings may be possible by maximizing the amounts of metal and sulfur on the vermiculite substrate. In the case of tin and titanium, applicants believe that the extended sorption performance offers an indication that the mercury capture by sulfur in the interlayer volume may be supplemented by amalgamation with the metal in the polyvalent metal sulfide (PVMS) sorbent.

Comparing the performance of activated carbon on quartz sand and the chemically amended vermiculite sorbent was difficult because these sorption tests were conducted at such drastically different pressures. The carbon tests were done at system pressure approaching thirty psig. The high pressure was due to the pressure drop through the quartz sand bed medium. Vermiculite, being a much less dense material than quartz sand, produced system pressures that were very low (less than 0.2 psig). System pressure has a great influence on the loading capacity of a sorbent material, whether the sorption process follows a physical adsorption or chemisorption mechanism. To compare the sorption capacities for carbon and vermiculite sorbents, the sorption capacity results must be adjusted to account for system pressure differences.

Sorption tests using the $Ti_2S_3$ doped vermiculite sorbent were carried out at three different pressures but at the same temperature. Pressure in the sorbent test apparatus was controlled by installing a valve downstream of the sorbent bed. A pressure gauge placed upstream of the sorbent bed was used to monitor system pressure. Sorption capacities based on initial mercury breakthrough from these tests are shown in Table 3.

Using the Potential Theory [Polanyi, M. Z. Physik, 2, p. 111 (1920)] a correlation was developed to correct the mercury uptake for the $Ti_2S_3$ vermiculite sorbent to 30 psig. These data were used to calculate the adsorption potential ($\epsilon/R$) at each pressure using the following equation:

$$\ln(P) = \ln(P^0_{Hg}) - 1/T(\epsilon/R)$$

where P is the system pressure, $P^0Hg$ is the vapor pressure for elemental mercury, and T is the absolute temperature in degrees Kelvin. A plot of mercury uptake as a function of ($\epsilon/R$) gave a nearly straight line with slope equal to $-0.0146$. The Potential Theory equation was rearranged to express mercury uptake (U) as a function of system pressure (P) and temperature (T):

$$U_2 = U_1 + T^*(\text{slope})^*\ln(P_1/P_2)$$

TABLE 3

Measured Vermiculite Sorbent Mercury Uptake as a Function of Pressure

| System Pressure (psig) | Mercury Uptake (µg Hg/g Sorbent) |
|---|---|
| 0 | 3.5 |
| 5 | 5.5 |
| 20 | 9.4 |

Mercury uptake for the $Ti_2S_3$ vermiculite sorbent at a system pressure of 30 psig and temperature of 280° F. was found to be 11 µg Hg/g sorbent. As presented previously, the mercury uptake for activated carbon at 30 psig was determined to be 6+/−2 µg Hg/g carbon. Thus, the titanium-doped vermiculite showed a factor-of-two advantage in mercury capacity over the activated carbon standard at this elevated pressure.

For controlling mercury emissions in coal-fired combustion gas, a viable sorbent preferably functions in the presence of acid gases that are normally associated with combustion processes. In particular, the sorbent preferably is able to remove mercury from gas streams with sulfur dioxide ($SO_2$), nitrogen dioxide ($NO_2$), nitric oxide (NO), and hydrogen chloride (HCl) gases present. Several researchers have investigated the effect of acid gases on the mercury sorption capacity of sorbents in the past decade. In 1997, the University of North Dakota Energy & Environmental Research Center (EERC) carried out a full-factorial design sorbent study that focused on the effects of $SO_2$, $NO_2$, NO, and HCl (Miller, S. J. et al., "Controlling Mechanisms That Determine Mercury Sorbent Effectiveness," $92^{nd}$ Annual Meeting Air & Waste Management Association, St. Louis, Mo., Jun. 21–24, 1999) on mercury capture. All of the simulated flue gas tests were conducted with Darco® FGD activated carbon and a low mercury concentration of approximately 15 µg/m³ at a gas temperature of 225° F. The baseline gas constituents were nitrogen, oxygen, carbon dioxide and water vapor at concentrations typical for coal-fired combustion gas.

The most dramatic effect on sorption capacity was seen in tests with $SO_2$ and $NO_2$ added to the baseline gas. With $NO_2$ alone, a 100 percent capture was observed for a period of 8 hours. However, when $SO_2$ was added to a gas stream containing $NO_2$, mercury breakthrough was observed almost immediately and increased rapidly to a level greater than the inlet mercury concentration. This was interpreted as indicating that not only did the $SO_2$ cause the sorbent to lose its ability to capture mercury, but it also caused the sorbent to desorb previously captured mercury.

In applicants' investigation, similar flue gas tests were conducted to determine the effect of acid gases on the mercury capacity for activated carbon and for the amended vermiculite sorbents. Due to time constraints, the test matrix consisted of only three tests. The baseline gas was the same for all tests, composed of five percent oxygen and ninety-five percent nitrogen. Concentrations of nitrogen dioxide and sulfur dioxide in the baseline gas were seventy parts per million (ppm) and 7,000 ppm, respectively.

Figure 8:
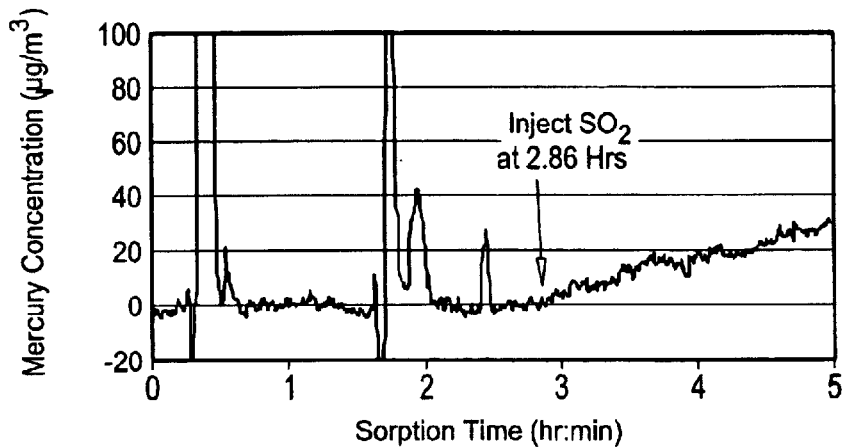
FIG. 8 is a graph presenting the result of testing of a background art sorbent, Darco® activated carbon.

In the test conducted with Darco® activated carbon, 0.1 grams of the carbon was dispersed onto 2.2 grams of virgin vermiculite and placed in the sorbent tube. A vermiculite substrate was used in these tests to minimize the pressure drop through the sorbent bed. The sorbent tube was connected to the sorbent test apparatus and heated to a temperature of 225° F. (The same sorbent temperature used in the EERC tests.) Nitrogen gas was flowing through the test apparatus as the equipment heated. At the start of the test, elemental mercury and nitrogen dioxide were added to the baseline gas at concentrations of thirty-five $\mu g/m^3$ and seventy ppm, respectively. No mercury breakthrough was observed initially. After one hour of testing, 7,000-ppm sulfur dioxide was added to the baseline gas. Within minutes after the injection of sulfur dioxide gas, mercury was seen in the outlet gas from the sorbent tube, as shown in FIG. 8. The mercury concentration rose to the inlet concentration over the next two hours. These test results are similar to those reported by EERC which showed the negative impact of sulfur dioxide and nitrogen dioxide gases on the mercury capacity for Darco® activated carbon.

Following the sorption cycle, the carbon sorbent was heated to 480° F. in nitrogen to evolve any captured mercury. The desorption process was monitored with the mercury analyzer to follow the evolution of mercury from the sorbent. The desorption mercury peak was integrated to determine the weight of captured mercury. The carbon was found to have sorbed five $\mu g$ mercury, which gives a total breakthrough mercury sorption capacity of fifty $\mu g/g$ carbon. Activated carbon lost sixty-three percent of its sorption capacity in the presence of sulfur dioxide and nitrogen dioxide in the feed gas stream.

The effect of sulfur dioxide and nitrogen dioxide gases on the mercury sorption capacity for the $Ti_2S_3$ vermiculite sorbent was also investigated. In these tests, outlet mercury concentration was followed over a twenty-four-hour period for a baseline gas with sulfur dioxide and for a baseline gas with a combination of sulfur dioxide and nitrogen dioxide. Sorbent material used for these tests was prepared from the same batch so that the results were comparable. Mercury concentration in the baseline gas was twenty-eight $\mu g/m^3$. Concentrations of sulfur dioxide and nitrogen dioxide in the baseline gas were 7,000-ppm and seventy ppm, respectively. Sorption tests ran for nearly twenty-four hours, after which time the sorbent was regenerated to evolve the captured mercury. The regeneration process was monitored with the mercury analyzer to follow the evolution of mercury from the sorbent. As a check, the desorbed mercury peak was integrated to determine the amount of mercury taken up by the sorbent.

No mercury breakthrough was observed during either test over the twenty-four-hour sorption cycle, which indicated that the chemically amended sorbent was not affected by either sulfur dioxide or a combination of nitrogen dioxide and sulfur dioxide gases. This was a significant finding and suggests that the $Ti_2S_3$ vermiculite sorbent has utility for mercury control in the coal-fired power industry. Upon integrating the desorption mercury peak, it was determined that sixteen $\mu g$ of mercury were taken up by the sorbent. This weight of mercury is consistent with the amount of mercury delivered based on the inlet mercury concentration. Again, applicants believe that the amount of mercury taken up by the sorbent can be greatly increased by improving the sorbent preparation method to add more sulfur to the vermiculite.

A sample of the sorbent was analyzed for amounts of titanium and sulfur by an outside laboratory. The analysis showed the vermiculite had eleven percent (by weight) titanium and only 0.4% (by weight) sulfur. Virgin vermiculite has approximately one percent (by weight) titanium in its natural state, so that ten percent titanium was added to the vermiculite material in the ion exchange step. This analytical result also indicates that the sulfurization step was not efficient in generating $Ti_2S_3$ in the vermiculite interlayers. If a stoichiometric reaction had occurred, the sulfur and titanium would have been present in approximately equal masses. Based on this elemental analysis, the mercury loading for the $Ti_2S_3$ vermiculite sorbent was calculated to be 1,100 $\mu g$ Hg/g sulfur, a significant loading for the sulfur present in the amended sorbent. If the sulfur loading had been present at a stoichiometric level with the titanium, there would have been approximately twenty times more sulfur on the vermiculite. Assuming one mole of mercury is taken up per mole of sulfur, the theoretical mercury uptake for the Ti-S sorbent having ten percent (by weight) sulfur per gram of sorbent is 600,000 $\mu g$ Hg/g sorbent.

One of the objectives of the testing was to demonstrate the ability of the PVMS sorbent to remove mercuric chloride from simulate flue gas. A test was carried out to quantify the mercuric chloride capacity for the $Ti_2S_3$ vermiculite sorbent. Similar to previous sorption tests, a simulated flue gas composed of $SO_2$, $NO_2$. $N_2$, $O_2$, and water vapor was doped with mercuric chloride and directed through a sorbent test bed. Mercuric chloride concentration in the simulated flue gas was approximately 100 $\mu g/m^3$. Concentrations of sulfur dioxide and nitrogen dioxide in the baseline gas were 2,600-ppm and 26 ppm, respectively. The $Ti_2S_3$ vermiculite sorbent was prepared from the same batch as the sorbent material used in the elemental mercury sorption tests so that the results were comparable.

The outlet mercury concentration of the sorbent vessel was monitored over a twenty-four-hour period. After taking up mercuric chloride for twenty-four hours from a simulated flue gas, the outlet mercury concentration was less than five percent of the inlet mercuric chloride concentration. The weight of mercuric chloride taken up by the sorbent was calculated to be 350 $\mu g$ per gram of sorbent. This is a significant finding and further shows that the $Ti_2S_3$ vermiculite sorbent has definite utility for mercury control in the coal-fired power industry.

Several important conclusions follow from the test data regarding the performance and application of the disclosed class of sorbents:

The new class of mercury sorbents based on polyvalent metal sulfides (PVMS) are easily precipitated from solution on to any suitable substrate.

The metal sulfides are preferably deployed into the flue gases as amendments on an expanded vermiculite support. This strategy maximizes the efficiency and minimizes the costs of the sorbents by exposing only molecularly thin films to the mercury. As a result, essentially all of the sulfide is readily available as a sorbent, on a very inexpensive substrate.

The sulfides of tin (SnS) and titanium ($Ti_2S_3$) showed the best promise to date and the actual capacity of these sorbents has yet to be determined, as they are so effective that the time required to determine the breakthrough capacities exceeded the time available to complete the experiments.

The form of the new sorbents ensures that they are "drop-in" replacements for carbon technology and will not require any additional technologies for injection, or particulate control.

The $Ti_2S_3$ sorbent was regenerated and continued to absorb mercury, without breakthrough for a second period of twenty-four hours.

The $Ti_2S_3$ sorbent removed over 95 percent of mercuric chloride from a simulated combustion gas with sulfur dioxide and nitrogen dioxide gases over a twenty-four-hour sorption cycle.

In the presence of both sulfur dioxide and nitrogen oxides, Darco® carbon showed virtually no capacity to absorb mercury. In contrast the absorption capacity of the new sorbents was unaffected by the presence of the acid gases.

The elemental mercury capacity for the $Ti_2S_3$ sorbent is roughly three times the capacity for Norit's Darco® activated carbon, in a nitrogen carrier. In the presence of acid flue gases the capacity of the applicants' sorbents exceeds that of carbon by one or two orders of magnitude.

The estimated manufactured cost for the PVMS sorbents is $0.50 per pound of sorbent, which compares favorably to $0.55 per pound for activated carbon.

Based on the finding that the $Ti_2S_3$ sorbent mercury capacity has at least three times the mercury capacity of activated carbon, the annual operating cost will be roughly one-third the estimated annual operating cost for a carbon injection system.

Many variations of the invention will occur to those skilled in the art. Some variations include disposal of the mercury-laden sorbent. Other variations call for regeneration of the mercury-laden sorbent. All such variations are intended to be within the scope and spirit of the invention.

What is claimed is:

1. A sorbent particle comprising:
   a vermiculite having a plurality of ion-exchange sites;
   a plurality of polyvalent metal ions exchanged at some of said ion-exchange sites; and
   a plurality of sulfide ions chemically reacted to at least some of said polyvalent metal ions;
   wherein said sorbent particle is essentially devoid of polysulfides, said sorbent particle has a largest dimension of less than about twenty micrometers and said sorbent particle is operative to capture at least ninety percent of the ionic and elemental mercury present in a flue gas containing acid gases to which it is exposed.

2. A method for removing mercury from a gas stream containing an acid gas, the method comprising:
   injecting and entraining the sorbent particle of claim 1 into the gas stream containing ionic and elemental mercury under conditions wherein at least a portion of said elemental and ionic mercury sorbs onto the sorbent particle during its exposure to the gas stream; and
   removing the sorbent particle from the gas stream.

3. The process of claim 2 wherein the removing step is accomplished by means of a process selected from the group consisting of
   filtration,
   electrostatic precipitation,
   an inertial method, and
   wet scrubbing.

4. A power plant comprising a mercury removal system operated in accordance with the method of claim 2.

5. A method for making a concrete additive that comprises:
   adding to a cement and aggregate mixture a fly ash containing a sorbent that has been used to remove mercury from a gas stream in the power plant of claim 4.

6. A system for removing mercury from a gas, the system comprising:
   an injector for injecting the sorbent of claim 1 into a flue gas stream;
   a contactor for contacting the sorbent with the flue gas stream and producing a mercury-laden sorbent; and
   a separator for separating the mercury-laden sorbent from the flue gas stream.

7. The system of claim 6 further comprising:
   a regenerator for regenerating the mercury-laden sorbent.

8. A power plant comprising the system of claim 7.

9. A power grid comprising the power plant of claim 8.

10. An incinerator comprising the system of claim 7.

11. A system for removing mercury from a gas, the system comprising:
    means for injecting the sorbent of claim 1 into a flue gas stream;
    means for contacting the sorbent with the flue gas stream and producing a mercury-laden sorbent; and
    means for separating the mercury-laden sorbent from the flue gas stream.

12. A sorbent particle comprising:
    a montmorillonite having a plurality of ion-exchange sites;
    a plurality of polyvalent metal ions exchanged at some of said ion-exchange sites; and
    a plurality of sulfide ions chemically reacted to at least some of said polyvalent metal ions;
    wherein said sorbent particle is essentially devoid of polysulfides, said sorbent particle has a largest dimension of less than about twenty micrometers and said sorbent particle is operative to capture at least some of the ionic and elemental mercury present in a flue gas containing acid gases to which it is exposed.

13. A system for removing mercury from a flue gas, the system comprising:
    a source of flue gas that contains an acid gas;
    means for exposing the flue gas to the sorbent of claim 12.

14. The system of claim 13 wherein the means for exposing comprises an injection and entrainment system and the system further comprises:
    means for separating the sorbent from the flue gas after the sorbent has contacted the flue gas for a time that is effective for the sorbent to capture mercury present in the flue gas.

15. A sorbent particle comprising:
    a cryptocrystalline phyllosilicate having a plurality of ion-exchange sites;
    a plurality of polyvalent metal ions exchanged at some of said ion-exchange sites; and
    a plurality of sulfide ions chemically reacted to at least some of said polyvalent metal ions;

wherein said sorbent particle is essentially devoid of polysulfides said sorbent particle is operative to capture at least some of the ionic and elemental mercury present in flue gas to which it is exposed.

16. A method for removing mercury from a gas stream, the method comprising:

injecting and entraining the sorbent particle of claim 3 into the gas stream containing ionic and elemental mercury under conditions wherein at least a portion of said elemental and ionic mercury sorbs onto the sorbent particle during its exposure to the gas stream; and removing the sorbent particle from the gas stream by means of a process selected from the group consisting of
filtration,
electrostatic precipitation,
an inertial method, and
wet scrubbing wherein the injecting and entraining step involves injecting and entraining the sorbent particle into a flue gas stream containing a plurality acid gases including sulfur dioxide in the range of a few hundred to a few thousand ppm, hydrogen chloride up to 20 ppm, and nitrogen oxides in the range of 200 to 2,000 ppm.

17. A method for removing mercury from a gas, the method comprising:

a step for injecting the sorbent of claim 15 into a flue gas stream;

a step for contacting the sorbent with the flue gas stream and producing a mercury-laden sorbent; and a step for separating the mercury-laden sorbent from the flue gas stream.

18. A sorbent comprising:

a phyllosilicate having a plurality of ion-exchange sites;

a plurality of polyvalent metal ions exchanged at some of said ion-exchange sites; and a plurality of sulfide ions chemically reacted to at least some of said polyvalent metal ions;

wherein said sorbent operative to accomplish sustained removal of the ionic and elemental mercury present in an acidic flue gas to which it is exposed.

19. A sorbent comprising:

a non-zeolitic, amorphous aluminosilicate having a plurality of ion-exchange sites;

a plurality of polyvalent metal ions exchanged at some of said ion-exchange sites; and a plurality of sulfide ions chemically reacted to at least some of said polyvalent metal ions;

wherein said sorbent is essentially devoid of copper and polysulfides.

20. An adsorbent composition for use in the adsorption of ionic and elemental mercury consisting essentially of:

a non-zeolitic aluminosilicate support material having cation sites, the material being selected from the class consisting of vermiculites, allophone and montmorillonites;

a cation selected from the group consisting of antimony, arsenic, bismuth, cadmium, cobalt, gold, indium, iron, lead, manganese, molybdenum, mercury, nickel, platinum, silver, tin, tungsten, titanium, vanadium, zinc, zirconium and mixtures thereof wherein the cation occupies some of the cation sites; and a sulfide.

21. A technique for removing mercury from a gas, the technique comprising:

contacting the adsorbent composition of claim 20 with a gas stream containing mercury at a temperature that does not exceed 350 degrees Fahrenheit for at least one second to produce a mercury-laden adsorbent composition comprising adsorbed mercury;

removing the mercury-laden adsorbent composition from the gas stream; and heating the mercury-laden adsorbent composition to a temperature of about 500 degrees Fahrenheit to desorb the adsorbed mercury from the mercury-laden adsorbent composition and produce a regenerated adsorbent composition; and removing the adsorbed mercury from the vicinity of the regenerated adsorbent composition.

22. An adsorbent composition for use in the adsorption of ionic and elemental mercury consisting essentially of:

a phyllosilicate support material having cation sites, the material being selected from the class consisting of vermiculites and montmorillonites;

a cation selected from the group consisting of antimony, arsenic, bismuth, cadmium, cobalt, copper, gold, indium, iron, lead, manganese, molybdenum, mercury, nickel, platinum, silver, tin, tungsten, titanium, vanadium, zinc, zirconium and mixtures thereof wherein the cation occupies some of the cation sites; and a sulfide.

23. A sorbent comprising:

a silicate having a first layered structure selected from the group consisting of
kaolinite,
halloysite,
montmorillonite,
illite,
bentonite,
chlorite, and
vermiculite;

impregnated with a metal sulfide having a second layered structure;

wherein said sorbent is essentially free of polysulfides.

24. The sorbent of claim 23 wherein the metal sulfide is selected from the group consisting of
polyvalent metal sulfides.

25. A method for removing mercury from a gas, the method comprising:

flowing the gas containing mercury through a fixed or fluidized bed comprised of the sorbent of claim 23.

26. A composition of matter consisting of:

a hydrated laminar magnesium aluminum ironsilicate having a plurality of ion-exchange sites;

a polyvalent metal ion derived from a highly acidic solution exchanged at some of said ion-exchange sites; and a plurality of sulfide ions chemically reacted to some of said polyvalent metal ions.

27. A composition of matter consisting essentially of:

montmorillonite having a plurality of ion-exchange sites;

a polyvalent metal ion exchanged at some of said ion-exchange sites; and a plurality of sulfide ions chemically reacted to said polyvalent metal ions;

in which each said sulfide ion has the formula $S_x^{-2}$ wherein x is 1.

28. A method for removing mercury from a gas, the method comprising:

injecting and entraining the composition of matter of claim 27 into a gas stream containing mercury at an operating pressure within about plus or minus 0.5 to 1.0 psig of ambient conditions; and removing the composition of matter from the gas stream to produce a collected composition of matter that remains exposed to the gas stream and that is capable of sorption of mercury, said removing being accomplished by a process selected from a group of methods consisting of:
filtration,
electrostatic precipitation,
inertial methods, and
wet scrubbing;
wherein at least a portion of said sorption of mercury occurs onto the collected composition of matter while it remains exposed to the gas stream.

29. An incinerator plant comprising a mercury removal system operated in accordance with the technique of claim 28.

30. A composition of matter made by combining:

phyllosilicate substrate material having a plurality of ion-exchange sites at which cations are exchangeable;

a plurality of polyvalent metal ions derived from a highly acidic solution that are exchanged at some of said ion-exchange sites; and a plurality of sulfide ions which are chemically reactable with some of said polyvalent metal ions.

31. A composition made by combining effective amounts of:

means for supporting having a first layered structure and a plurality of ion-exchange sites at which cations are exchangeable;

a plurality of polyvalent metal ions which are reversibly substituted at some of said ion-exchange sites; and a plurality of sulfide ions which are chemically reacted to some of said polyvalent metal ions to produce a second layered structure having an inter-layer spacing of about five nanometers;

wherein said composition comprises essentially no polysulfide ions and is capable of removing mercury from a gas stream containing trace amounts of acid gases.

32. A system for removing mercury from a gas, the system comprising:

means for flowing the gas containing mercury through a sorbent container having a bed comprising the composition described in claim 31 operating at gas temperatures greater than 500 degrees Fahrenheit and pressures greater than ambient conditions; and means for removing the mercury from the composition by reducing the operating pressure of the sorbent container, while maintaining the temperature of the composition at or near the normal operating temperature for the process.

33. A concrete made by combining:

a cement;

an aggregate;

a fly ash containing the composition of claim 31 that has been used to remove mercury from a gas stream.

34. A composition made by combining effective amounts of:

a synthetic montmorillinite having a plurality of ion-exchange sites at which cations are exchangeable;

a plurality of polyvalent metal ions in a highly acidic solution which are reversibly substituted at some of said ion-exchange sites; and a plurality of sulfide ions that are other than copper ions which are chemically reacted to some of said polyvalent metal ions;

wherein said composition is essentially devoid of polysulfide ions and is capable of sorbing mercury from a gas.

35. An adsorbent composition for use in the adsorption of elemental mercury consisting essentially of:

a support material selected from the class consisting of phyllosilicates;

a cation selected from the group consisting of
a bivalent tin ion,
a tetravalent tin ion,
a bivalent iron ion,
a trivalent iron ion,
a titanium ion,
a manganese ion,
a zirconium ion,
a vanadium ion,
a zinc ion,
a nickel ion,
a bismuth ion,
a cobalt ion,
and a molybdenum ion; and
a sulfide;
wherein said composition is essentially devoid of polysulfides.

36. The adsorbent composition of claim 35 wherein the phyllosilicate is selected from the class consisting of vermiculite and montmorillonite and the at least one cation is selected from the group consisting of copper, cobalt, manganese, nickel and mixtures thereof.

37. A concrete additive comprising:

a fly ash containing the adsorbent composition of claim 35 that has been used to remove mercury from a gas stream and is mercury laden.

38. A process for the preparation of sorbent particles for ionic and elemental mercury comprising:

(a) reducing the size of a phyllosilicate support material having cation sites, the material being selected from the class consisting of vermiculites and montmorillonites, to a particle having a largest dimension of less than about twenty micrometers;

(b) providing the particle of step (a) with at least one cation capable of forming an insoluble sulfide and selected from the group consisting of antimony arsenic, bismuth, cadmium, cobalt, gold, indium, iron, lead, manganese, molybdenum, mercury, nickel, platinum, silver, tin, tungsten, titanium, vanadium, zinc, zirconium and mixtures thereof; and (c) contacting the cation-containing particle of step (b) with a solution containing a sulfide-forming species and devoid of a polysulfide-forming species to produce a sorbent particle that is operative to capture at least some of the ionic and elemental mercury present in flue gas containing trace amounts of acid gas species to which it is exposed.

39. A process for the preparation of adsorbent compositions for elemental mercury comprising:

providing a support material selected from the class consisting of phyllosilicates with at least one cation capable of forming an insoluble sulfide and selected from the group consisting of antimony arsenic, bismuth, cadmium, cobalt, gold, indium, iron, lead, manganese, molybdenum, mercury, nickel, platinum, silver, tin, tungsten, titanium, vanadium, zinc, zirconium and mixtures thereof; and contacting the cation-containing support material of the foregoing step with a sulfide-forming species and not a polysulfide-forming species.

40. A process for producing a sorbent particle comprising:

reducing the size of a phyllosilicate material to produce a phyllosilicate particle having a largest dimension of less than about twenty micrometers;

contacting the phyllosilicate particle with a highly acidic solution containing a plurality of polyvalent metal ions other than copper ions to produce an exchanged phyllosilicate particle;

separating the exchanged phyllosilicate particle from the solution;

contacting the exchanged phyllosilicate particle with a fluid containing a plurality of sulfide ions and devoid of polysulfide ions to produce an amended phyllosilicate particle; and separating the amended phyllosilicate particle from the fluid to produce a sorbent particle that is operative to capture at least some of the ionic and elemental mercury present in flue gas to which it is exposed.

41. A process for producing a sorbent particle comprising:

reducing the size of a vermiculite material to produce a vermiculite particle having a first layered structure and a largest dimension of less than about twenty micrometers;

contacting the vermiculite particle with a solution containing a plurality of polyvalent metal ions to produce an exchanged vermiculite particle;

separating the exchanged vermiculite particle from the solution;

contacting the exchanged vermiculite particle with a fluid containing a plurality of sulfide ions and devoid of polysulfide ions to produce an amended vermiculite particle containing an amendment having a second layered structure; and separating the amended vermiculite particle from the fluid to produce a sorbent particle that is operative to capture at least some of the ionic and elemental mercury present in flue gas to which it is exposed.

42. A process for producing a sorbent particle comprising:

reducing the size of a montmorillonite material to produce a montmorillonite particle having a largest dimension of less than about twenty micrometers;

contacting the montmorillonite particle with a solution containing a plurality of polyvalent metal ions to produce an exchanged montmorillonite particle;

separating the exchanged montmorillonite particle from the solution;

contacting the exchanged montmorillonite particle with a fluid containing a plurality of sulfide ions and devoid of polysulfide ions to produce an amended montmorillonite particle; and separating the amended montmorillonite particle from the fluid to produce a sorbent particle that is operative to capture at least some of the ionic and elemental mercury present in flue gas to which it is exposed.

43. A process for preparing a sorbent composition comprising:

contacting a support material with a highly acidic solution containing at least one cation capable of forming an insoluble sulfide other than a copper sulfide;

contacting the cation containing support of the previous step with a species that is capable of forming a sulfide but not a polysulfide.

44. A process for producing a sorbent comprising:

contacting a phyllosilicate substrate material with a solution containing a polyvalent metal ion to produce an exchanged phyllosilicate;

separating the exchanged phyllosilicate from the solution;

contacting the exchanged phyllosilicate with a fluid containing a sulfide ion other than a polysulfide ion to produce an amended phyllosilicate;

separating the amended phyllosilicate from the fluid to produce a sorbent.

45. The process of claim 44 further comprising:

washing the exchanged phyllosilicate after it is separated from the solution.

46. The process of claim 44 further comprising:

washing the amended phyllosilicate after it is separated from the fluid.

47. The process of claim 46 further comprising:

drying the amended phyllosilicate after it is washed.

48. The process of claim 44 further comprising:

processing the solution separated from the exchanged phyllosilicate using a technique selected from the group consisting of reusing the solution, and treating the solution to recover unused metal ions.

49. The process of claim 44 wherein the pyllosilicate substrate material is contacted with a solution containing a polyvalent metal ion selected from the group consisting of a bivalent tin ion, a tetravalent tin ion, a bivalent iron ion, a trivalent iron ion, a titanium ion, a manganese ion, a zirconium ion, a vanadium ion, a zinc ion, a nickel ion, a bismuth ion, a cobalt ion, and a molybdenum ion.

50. The process of claim 44 wherein the exchanged phyllosilicate is separated from solution using a process selected from the group consisting of settling, flotation, filtration, and centrifugation.

51. The process of claim 44 wherein the phyllosilicate substitute material is contacted with the solution using a method selected from the group consisting of batch contacting, co-current contacting, and counter-current contacting.

52. The process of claim 44 wherein the exchanged phyllosilicate is contacted with a fluid selected from the group consisting of a gas phase source of sulfide, and a liquid phase source of sulfide.

53. The process of claim 44 wherein in the exchanged phyllosilicate is contacted with hydrogen sulfide gas.

54. The process of claim 44 wherein the exchanged phyllosilicate is contacted with a solution containing a source of sulfide ions selected from the group consisting of sodium sulfide, sodium bisulfite, potassium sulfide, calcium sulfide, calcium polysulfide, ammonium sulfide, and another compound containing sulfur in the sulfide state.

55. The process of claim 44 wherein the fluid is an aqueous solution and the process further comprises:

adjusting the pH of the aqueous solution to a pH of in the range of 6 to 9.

56. The process of claim 55 wherein the pH is adjusted to within approximately plus or minus 0.5 pH units of pH 7.

57. A process for removing mercury from a gas, the process comprising:

contacting the gas containing mercury with a sorbent produced using the process of claim 44.

58. A sorbent production system comprising:

means for contacting a silicate substrate material with a solution containing a polyvalent metal ion other than a copper ion to produce an exchanged silicate;

means for separating the exchanged silicate from the solution;

means for contacting the exchanged silicate with a fluid containing a sulfide ion being devoid of a polysulfide ion to produce an amended silicate; and means for separating the amended silicate from the fluid to produce a sorbent.

* * * * *